(12) United States Patent
Sugimoto et al.

(10) Patent No.: US 9,799,105 B2
(45) Date of Patent: Oct. 24, 2017

(54) IMAGE PROCESSING DEVICE, IMAGING DEVICE, IMAGE PROCESSING METHOD, AND PROGRAM FOR RESTORATION PROCESSING BASED ON A POINT SPREAD FUNCTION AND A FRAME AFTER A FRAME TO BE PROCESSED

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 74 days.

(21) Appl. No.: 15/003,849

(22) Filed: Jan. 22, 2016

(65) Prior Publication Data
US 2016/0140697 A1 May 19, 2016

Related U.S. Application Data

(63) Continuation of application No. PCT/JP2014/066431, filed on Jun. 20, 2014.

(30) Foreign Application Priority Data

Aug. 2, 2013 (JP) .................................. 2013-161616

(51) Int. Cl.
*G06T 5/00* (2006.01)
*G06T 5/20* (2006.01)
(Continued)

(52) U.S. Cl.
CPC ................ *G06T 5/003* (2013.01); *G06T 5/20* (2013.01); *G06T 5/50* (2013.01); *G06T 7/20* (2013.01);
(Continued)

(58) Field of Classification Search
CPC .. G06T 5/003; G06T 5/20; G06T 5/50; G06T 7/20; G06T 5/006; H04N 5/225; H04N 5/23229
See application file for complete search history.

(56) References Cited

U.S. PATENT DOCUMENTS 8,570,432 B2 * 10/2013 Yamashita ......... H04N 5/23212
348/349
8,724,008 B2 * 5/2014 Inoue ................... H04N 5/3572
348/270
(Continued)

FOREIGN PATENT DOCUMENTS

JP 2008-11492 A 1/2008
JP 2009-171341 A 7/2008
(Continued)

OTHER PUBLICATIONS

English translation of International Preliminary Report on Patentability issued in PCT/JP2014/066431, dated Feb. 2, 2016.
(Continued)

*Primary Examiner* — Nicholas Giles
(74) *Attorney, Agent, or Firm* — Birch, Stewart, Kolasch & Birch, LLP

(57) ABSTRACT

Disclosed are an image processing device, an imaging device, an image processing method, and a program capable of acquiring a moving image with excellent image quality while maintaining continuity of a restoration process between frames even if there is a rapid change of a photographing environment in a moving image. An image processing device includes a restoration control processing unit 36 which subjects a moving image including a plurality of frames acquired by photographing using an optical system to a restoration process based on a point spread function of the optical system to acquire recovered image data. The restoration control processing unit 36 controls the restoration
(Continued)

process for a frame to be processed among a plurality of frames based on imaging information of a reference frame including a frame after the frame to be processed in a time series.

29 Claims, 22 Drawing Sheets

(51) Int. Cl.
G06T 5/50 (2006.01)
G06T 7/20 (2017.01)
H04N 5/225 (2006.01)
H04N 5/232 (2006.01)

(52) U.S. Cl.
CPC ......... *H04N 5/225* (2013.01); *H04N 5/23229* (2013.01); *G06T 2207/10016* (2013.01); *G06T 2207/20192* (2013.01); *G06T 2207/20201* (2013.01)

(56) References Cited

U.S. PATENT DOCUMENTS

2009/0110303 A1* 4/2009 Nishiyama ......... G06K 9/00228
382/225
2010/0157084 A1 6/2010 Shimamura et al.
2010/0310165 A1* 12/2010 Chen ..................... G06T 5/003
382/167
2011/0242373 A1* 10/2011 Inoue ................... H04N 5/3572
348/242
2012/0050580 A1* 3/2012 Iwasaki ............. H04N 5/23212
348/240.99
2013/0177256 A1 7/2013 Kita et al.

FOREIGN PATENT DOCUMENTS

| JP | 2010-147808 A | 7/2010 |
| JP | 2010-283527 A | 12/2010 |
| JP | 2012-65114 A | 3/2012 |
| JP | 2013-142997 A | 7/2013 |

OTHER PUBLICATIONS

International Search Report issued in PCT/JP2014/066431, dated Sep. 16, 2014.
Written Opinion of the International Searching Authority issued in PCT/JP2014/066431, dated Sep. 16, 2014.

* cited by examiner

FIG. 7

| FRAME | DIAPHRAGM VALUE (F VALUE) | |
|---|---|---|
| FRAME (t-3) | F2 | → RESTORATION PROCESS USING FILTER FOR F2 |
| FRAME (t-2) | F2 | → RESTORATION PROCESS USING FILTER FOR F2 |
| FRAME (t-1) | F2 | → RESTORATION PROCESS USING FILTER FOR F2 |
| FRAME (t) | F2.8 | |
| FRAME (t+1) | F2 | |
| FRAME (t+2) | F2 | |
| FRAME (t+3) | F2 | |

FIG. 8

| FRAME | DIAPHRAGM VALUE (F VALUE) | |
|---|---|---|
| FRAME (t-3) | F2 | |
| FRAME (t-2) | F2 | |
| FRAME (t-1) | F2 | |
| FRAME (t) | F2.8 | → RESTORATION PROCESS USING FILTER FOR F2 |
| FRAME (t+1) | F1.4 | → RESTORATION PROCESS USING FILTER FOR F1.4 |
| FRAME (t+2) | F1.4 | |
| FRAME (t+3) | F1.4 | |

FIG. 10A

| $k00_{t-1}$ | $k10_{t-1}$ | $k20_{t-1}$ | $k30_{t-1}$ | $k40_{t-1}$ |
|---|---|---|---|---|
| $k01_{t-1}$ | $k11_{t-1}$ | $k21_{t-1}$ | $k31_{t-1}$ | $k41_{t-1}$ |
| $k02_{t-1}$ | $k12_{t-1}$ | $k22_{t-1}$ | $k32_{t-1}$ | $k42_{t-1}$ |
| $k03_{t-1}$ | $k13_{t-1}$ | $k23_{t-1}$ | $k33_{t-1}$ | $k43_{t-1}$ |
| $k04_{t-1}$ | $k14_{t-1}$ | $k24_{t-1}$ | $k34_{t-1}$ | $k44_{t-1}$ |

| $k00_t$ | $k10_t$ | $k20_t$ | $k30_t$ | $k40_t$ |
|---|---|---|---|---|
| $k01_t$ | $k11_t$ | $k21_t$ | $k31_t$ | $k41_t$ |
| $k02_t$ | $k12_t$ | $k22_t$ | $k32_t$ | $k42_t$ |
| $k03_t$ | $k13_t$ | $k23_t$ | $k33_t$ | $k43_t$ |
| $k04_t$ | $k14_t$ | $k24_t$ | $k34_t$ | $k44_t$ |

| $k00_{t+1}$ | $k10_{t+1}$ | $k20_{t+1}$ | $k30_{t+1}$ | $k40_{t+1}$ |
|---|---|---|---|---|
| $k01_{t+1}$ | $k11_{t+1}$ | $k21_{t+1}$ | $k31_{t+1}$ | $k41_{t+1}$ |
| $k02_{t+1}$ | $k12_{t+1}$ | $k22_{t+1}$ | $k32_{t+1}$ | $k42_{t+1}$ |
| $k03_{t+1}$ | $k13_{t+1}$ | $k23_{t+1}$ | $k33_{t+1}$ | $k43_{t+1}$ |
| $k04_{t+1}$ | $k14_{t+1}$ | $k24_{t+1}$ | $k34_{t+1}$ | $k44_{t+1}$ |

| $A00_t$ | $A10_t$ | $A20_t$ | $A30_t$ | $A40_t$ |
|---|---|---|---|---|
| $A01_t$ | $A11_t$ | $A21_t$ | $A31_t$ | $A41_t$ |
| $A02_t$ | $A12_t$ | $A22_t$ | $A32_t$ | $A42_t$ |
| $A03_t$ | $A13_t$ | $A23_t$ | $A33_t$ | $A43_t$ |
| $A04_t$ | $A14_t$ | $A24_t$ | $A34_t$ | $A44_t$ |

IMAGE PROCESSING DEVICE, IMAGING DEVICE, IMAGE PROCESSING METHOD, AND PROGRAM FOR RESTORATION PROCESSING BASED ON A POINT SPREAD FUNCTION AND A FRAME AFTER A FRAME TO BE PROCESSED

CROSS-REFERENCE TO RELATED APPLICATIONS

This application is a Continuation of PCT International Application No. PCT/JP2014/066431 filed on Jun. 20, 2014, which claims priority under 35 U.S.C. §119(a) to Patent Application No. 2013-161616 filed in Japan on Aug. 2, 2013, all of which are hereby expressly incorporated by reference into the present application.

BACKGROUND OF THE INVENTION

1. Field of the Invention

The present invention relates to an image processing device, an imaging device, an image processing method, and a program, and in particular, to an image processing device, an imaging device, an image processing method, and a program which perform a restoration process based on a point spread function.

2. Description of the Related Art

In an object image photographed through an imaging optical system, a so-called point spread phenomenon in which a point object has minute spread due to the influence of diffraction, aberration, or the like caused by the imaging optical system may be observed. A function representing a response to a point light source of an optical system is called a point spread function (PSF), and is known as a parameter responsible for resolution deterioration (blurring) of a photographic image.

The photographic image deteriorated in image quality due to the point spread phenomenon can be recovered in image quality through a restoration process (point image restoration process) based on the PSF. The point image restoration process is a process in which a deterioration characteristic (point image characteristic) caused by aberration or the like of a lens (optical system) is determined in advance, and point spread of the photographic image is cancelled through an image process using a restoration filter according to the point image characteristic.

While improvement of image quality is basically expected if the restoration process is performed, the restoration process may cause deterioration of image quality. In order to cope with this case, various methods have been suggested.

For example, JP2009-171341A discloses a shake correction device which suppresses the execution of an unnecessary shake correction process. This correction device estimates uniformity of shakes included in an image to be corrected from two images for estimation and performs the shake correction process based on uniformity using a PSF.

In addition, if a restoration process is performed for a saturated pixel or a defocus region, image quality may be deteriorated, and various methods which cope with image quality deterioration due to the restoration process for the saturated pixel or the defocus region have been suggested.

For example, JP2010-283527A discloses an image processing device which suppresses noise occurring when a restoration process is performed for an overexposed white region, that is, a region where a saturated pixel is included, and reduces image quality deterioration due to an imaging optical system. This image processing device performs gain adjustment based on correction of an exposure of imaging data subjected to a recovery process.

JP2012-65114A discloses a technique which sets a defocus position and performs blur correction using a PSF with reference to information relating to the defocus position.

In addition, various methods which perform a point image restoration process for a moving image have been suggested.

For example, JP2008-11492A discloses an imaging device which performs a restoration process using a PSF for a moving image. This imaging device uses a first filter when an image restoration process is performed for a still image, and uses a second filter when an image restoration process is performed for a moving image.

SUMMARY OF THE INVENTION

However, when a restoration process is performed for a moving image with "a rapid change of a photographing environment", in the techniques disclosed in JP2009-171341A, JP2010-283527A, JP2012-65114A, and JP2008-11492A, the content of the restoration process is changed according to the photographing environment of each frame; thus, a great different may occur in the content of the restoration process between the frames. Such a great difference in the content of the restoration process between the frames is not preferable in a moving image which requires continuity of an image.

The invention has been accomplished in consideration of such a situation, and an object of the invention is to provide an image processing device, an imaging device, an image processing method, and a program capable of acquiring a moving image with favorable image quality while maintaining continuity of a restoration process between frames even if there is "a rapid change of a photographing environment".

An aspect of the invention relates to an image processing device including a restoration control processing unit which subjects a moving image including a plurality of frames acquired by photographing using an optical system to a restoration process based on a point spread function of the optical system to acquire recovered image data. The restoration control processing unit controls the restoration process for a frame to be processed among the plurality of frames based on imaging information of a reference frame including a frame after the frame to be processed in a time series.

According to this aspect, the restoration process for the frame to be processed is performed based on the imaging information of the reference frame. With this, in this aspect, it is possible to acquire a moving image with favorable image quality while maintaining continuity of the restoration process between the frame to be processed and the reference frame.

The "frame to be processed" is a target frame where the restoration process which is executed in the restoration control processing unit is performed.

The "reference frame" is a frame which is a frame other than the frame to be processed among a plurality of images constituting a moving image and includes at least a frame after the frame to be processed in a time series. A single or a plurality of reference frames may be available.

Preferably, the reference frame includes a frame before the frame to be processed in a time series.

According to this aspect, since the frame before the frame to be processed in a time series is included as the reference frame, the reference frame has a preceding frame in a time series and a succeeding frame in a time series. With this, in this aspect, it is possible to perform a restoration process with more excellent continuity before and after the frame to be processed.

Preferably, the reference frame includes a frame immediately before and a frame immediately after the frame to be processed in a time series.

According to this aspect, the content of the restoration process is adjusted based on the imaging information in the frames immediately before and immediately after the frame to be processed in a time series. With this, in this aspect, it is possible to perform a restoration process with favorable continuity immediately before and immediately after the frame to be processed.

Preferably, the restoration control processing unit controls the restoration process for the frame to be processed based on the imaging information of the reference frame and the imaging information of the frame to be processed.

According to this aspect, since the content of the restoration process is adjusted based on the imaging information of the reference frame and the frame to be processed, in this aspect, it is possible to perform a restoration process with better continuity between the frame to be processed and the reference frame.

Preferably, the imaging information includes photographing condition information of the frame to be processed and the reference frame.

According to this aspect, the content of the restoration process is adjusted based on the photographing condition information of the frame to be processed and the reference frame. With this, in this aspect, it is possible to perform a restoration process with continuity even if the photographing condition information greatly changes between the frame to be processed and the reference frame.

Preferably, the photographing condition information includes at least one of a diaphragm value and a zoom magnification.

According to this aspect, the content of the restoration process is adjusted based on the diaphragm value or the zoom magnification. With this, in this aspect, it is possible to perform a restoration process with continuity regardless of a rapid change of the diaphragm value or the zoom magnification.

Preferably, the restoration control processing unit performs the restoration process based on the most frequent photographing condition among the photographing condition information of the frame to be processed and the reference frame.

According to this aspect, the content of the restoration process is stably adjusted based on the most frequent photographing condition. With this, in this aspect, the content of the restoration process according to the photographing conditions is stabilized, and it is possible to perform a restoration process with continuity.

Preferably, the restoration process includes a filtering process using a restoration filter based on the point spread function, and the restoration control processing unit performs a filtering process using, as a restoration filter, a filter calculated based on a restoration filter corresponding to the photographing condition information of the frame to be processed and a restoration filter corresponding to the photographing condition information of the reference frame for the frame to be processed to perform the restoration process for the frame to be processed.

According to this aspect, a new restoration filter is calculated based on the restoration filter of the frame to be processed and the restoration filter of the reference frame, and the restoration process is executed based on the new restoration filter. With this, in this aspect, it is possible to perform a more appropriate restoration process for the frame to be processed and to perform a restoration process with continuity between the frames.

Preferably, the restoration control processing unit performs a filtering process using, as a restoration filter, a filter calculated from a weighted average of a restoration filter corresponding to the photographing condition information of the frame to be processed and a restoration filter corresponding to the photographing condition information of the reference frame for the frame to be processed to perform the restoration process for the frame to be processed.

According to this aspect, the restoration filter of the frame to be processed and the restoration filter of the reference frame are weighted and averaged, whereby a new restoration filter is calculated. With this, in this aspect, it is possible to perform a restoration process with continuity based on the importance of each frame. Furthermore, in this aspect, it is possible to provide a moving image with favorable image quality even if an object moves.

Preferably, the restoration control processing unit sets image data calculated from a weighted average of image data calculated by applying a restoration filter corresponding to the photographing condition information of the frame to be processed to the frame to be processed and image data calculated by applying a restoration filter corresponding to the photographing condition information of the reference frame to the reference frame as the recovered image data of the frame to be processed.

According to this aspect, image data determined by the weighted average of the image data obtained by performing the restoration process for the frame to be processed and the image data obtained by performing the restoration process for the reference frame is set as the recovered image data of the frame to be processed. With this, in this aspect, it is possible to perform a restoration process with continuity based on the importance of each frame.

Preferably, the image processing device further includes an object detection unit which detects motion of an object of the moving image, when the motion amount of the object in the frame to be processed and the reference frame detected by the object detection unit is equal to or greater than a threshold value, the restoration control processing unit performs a filtering process using, as a restoration filter, a filter calculated from a weighted average of a restoration filter corresponding to the photographing condition information of the frame to be processed and a restoration filter corresponding to the photographing condition information of the reference frame for the frame to be processed to perform the restoration process for the frame to be processed, and when the motion amount of the object in the frame to be processed and the reference frame detected by the object detection unit is less than the threshold value, the restoration control processing unit sets image data calculated from a weighted average of image data calculated by applying a restoration filter corresponding to the photographing condition information of the frame to be processed to the frame to be processed and image data calculated by applying a restoration filter corresponding to the photographing condition information of the reference frame to the reference frame as the recovered image data of the frame to be processed.

According to this aspect, the content of the restoration process is distinguished between a case where the restoration filter is newly generated based on motion of an object and the restoration process is performed to determine recovered image data relating to the frame to be processed and a case where recovered image data relating to the frame to be processed is determined by the weighted average of the recovered image data of the frame to be processed and the recovered image data of the reference frame. With this, in this aspect, it is possible to perform a favorable image process according to motion of the object.

The "motion amount" is not particularly limited as long as motion of an object image in a moving image is expressed quantitatively, and numerical values or the like representing various objects, for example, a main object can be used. Furthermore, the "threshold value" is not particularly limited, and can be appropriately determined by the relationship between the motion amount and an image process of the invention.

Preferably, the imaging information includes image information of the frame to be processed and the reference frame.

According to this aspect, the restoration process is performed based on the image information of the frame to be processed and the reference frame. With this, in this aspect, it is possible to perform a restoration process with continuity according to the image information.

Preferably, the image information includes at least one of information regarding whether or not a saturated pixel is included in the frame to be processed and the reference frame and information regarding whether or not a defocus region is included in the frame to be processed and the reference frame.

According to this aspect, the content of the restoration process is adjusted based on the presence or absence of the saturated pixel or the defocus region. With this, it is possible to perform a restoration process with favorable continuity even if a saturated pixel or a defocus region occurs in the middle of a moving image.

Preferably, the image information includes information regarding whether or not a saturated pixel is included in the frame to be processed and the reference frame, and the restoration control processing unit determines whether or not a saturated pixel is included in the reference frame, and when it is determined that the saturated pixel is included in the reference frame, adjusts the restoration intensity of the restoration process for the frame to be processed based on the imaging information of the reference frame where the saturated pixel is included.

According to this aspect, in the case of a moving image which has a frame including a saturated pixel, the restoration intensity of the restoration process is adjusted based on the imaging information of the frame where the saturated pixel is included. With this, in this aspect, it is possible to perform a restoration process with continuity even if a saturated pixel exists in a moving image.

Preferably, the restoration control processing unit analyzes a blinking state of a light source in the reference frame, and adjusts the restoration intensity of the restoration process for the frame to be processed based on the blinking state of the light source.

According to this aspect, when a blinking light source is in a moving image, the restoration intensity of the restoration process is adjusted based on the blinking light source. With this, in this aspect, it is possible to perform a restoration process with continuity even if a blinking light source exists in a moving image.

Preferably, the image information includes information regarding whether or not a defocus region is included in the frame to be processed and the reference frame, and the restoration control processing unit determines whether or not a defocus region is included in the reference frame, and when it is determined that the defocus region is included in the reference frame, adjusts the restoration intensity of the restoration process for the frame to be processed based on the imaging information of the reference frame where the defocus region is included.

According to this aspect, when a defocus region is in a moving image, the restoration intensity of the restoration process is adjusted based on the moving image. With this, in this aspect, it is possible to perform a restoration process with favorable continuity even if a defocus region is in a moving image.

Preferably, the image processing device further includes a moving body detection unit which detects a moving body in the moving image, and when the moving body is detected in the frame to be processed and the reference frame by the moving body detection unit, the restoration control processing unit subjects the frame to be processed to the restoration process based on the point spread function reflecting phase characteristics according to motion of the moving body.

According to this aspect, in the case of a moving image obtained by imaging a moving body, it is possible to perform a restoration process based on the detection of the moving body. With this, it is possible to perform a restoration process with favorable image quality even in a moving image obtained by imaging a moving body.

Preferably, the restoration control processing unit has a filter application unit which applies a restoration filter based on a point spread function of the optical system to source image data of the moving image to acquire restored image data, and a gain adjustment unit which performs adjustment of an amplification factor of the difference between the source image data and the restored image data, and acquires the recovered image data of the moving image from the difference after the adjustment is performed and the source image data, and the restoration process for the frame to be processed is controlled by adjusting at least one of the restoration filter and the amplification factor based on photographing information of the reference frame.

According to this aspect, the control of the restoration process is performed by the filter application unit and the gain adjustment unit. With this, in this aspect, it is possible to perform the control of the restoration process by the adjustment of the restoration filter and the adjustment of the gain.

Preferably, the optical system has a lens unit which modulates a phase to extend a depth of field.

According to this aspect, in regard to source image data obtained through an extended depth of field (focus) (EDoF) optical system, it is possible to perform the restoration process with image quality deterioration suppressed. A method (optical phase modulation means) of modulating a phase in the lens unit is not particularly limited, and a phase modulation unit may be provided between lenses, or a lens itself (for example, an incidence surface and/or an output surface of a lens) may have a phase modulation function.

Another aspect of the invention is a technique relating to an imaging device including an imaging element which acquires a moving image by photographing using an optical system, and the above-described image processing device.

Preferably, the imaging device further includes a display unit which displays a live view image, and the restoration control processing unit performs the restoration process based on the point spread function of the optical system for the live view image, and the restoration process for the live view image controls the restoration process for the frame to be processed among a plurality of frames constituting the live view image based on imaging information of the frame to be processed without depending on imaging information of a frame acquired before or after the frame to be processed in a time series.

According to this aspect, since the restoration process of the frame to be processed according to the imaging information of the reference frame is not performed for the live view image, it is possible to reduce a load of calculation associated with an image process. With this, in this aspect, it is possible to acquire a live view image with favorable responsiveness.

Preferably, the imaging device further includes a display unit which displays a live view image, and the restoration control processing unit does not perform the restoration process based on the point spread function of the optical system for the live view image.

According to this aspect, since the restoration process is not performed for the live view image, it is possible to reduce a load of calculation associated with an image process. With this, in this aspect, it is possible to acquire a live view image with favorable responsiveness.

Still another aspect of the invention is a technique relating to an image processing method which subjects a moving image including a plurality of frames acquired by photographing using an optical system to a restoration process based on a point spread function of the optical system to acquire recovered image data. The restoration process for a frame to be processed among the plurality of frames is controlled based on imaging information of a reference frame including a frame after the frame to be processed in a time series.

Still another aspect of the invention is a technique relating to a program which causes a computer to execute a procedure for subjecting a moving image including a plurality of frames acquired by photographing using an optical system to a restoration process based on a point spread function of the optical system to acquire recovered image data. The restoration process for a frame to be processed among the plurality of frames is controlled based on imaging information of a reference frame including a frame after the frame to be processed in a time series.

According to the invention, since the restoration process for a frame where the restoration process is performed, that is, for a frame to be processed is controlled based on the imaging information of the reference frame including a frame after the frame to be processed in a time series, even if there is a rapid change of a photographing environment in a moving image, it is possible to gradually adjust the content of the restoration process from the preceding stage of the change, to perform a restoration process with favorable continuity while suppressing a rapid change of the content of the restoration process, and to suppress deterioration of image quality due to the restoration process.

BRIEF DESCRIPTION OF THE DRAWINGS

FIG. 7 is a diagram illustrating an example relating to adjustment of the content of a restoration process which is performed by a restoration adjustment unit.

FIG. 8 is a diagram illustrating an example relating to adjustment of the content of the restoration process which is performed by the restoration adjustment unit.

FIGS. 10A to 10D are diagrams illustrating generation of a new restoration filter by weighting and averaging coefficients of restoration filters.

FIG. 20A shows a blurred image before a restoration process, and FIG. 20B shows an image (point image) with blur eliminated after the restoration process.

DESCRIPTION OF THE PREFERRED EMBODIMENTS

An embodiment of the invention will be described referring to the accompanying drawings. In the following embodiment, an example where the invention is applied to a digital camera 10 (imaging device) which is connectable to a computer (personal computer (PC)) 60 will be described.

In the following example, although a lens interchangeable digital camera 10 in which the optical system 12 and the camera body 14 constituted separately are combined has been described, the same restoration process can be performed to a lens fixed digital camera 10 in which the optical system 12 and the camera body 14 are constituted integrally. The digital camera 10 may be a video camera which has a principal function of moving image photographing, or an imaging device which can photograph both of a still image and a moving image.

Figure 1:
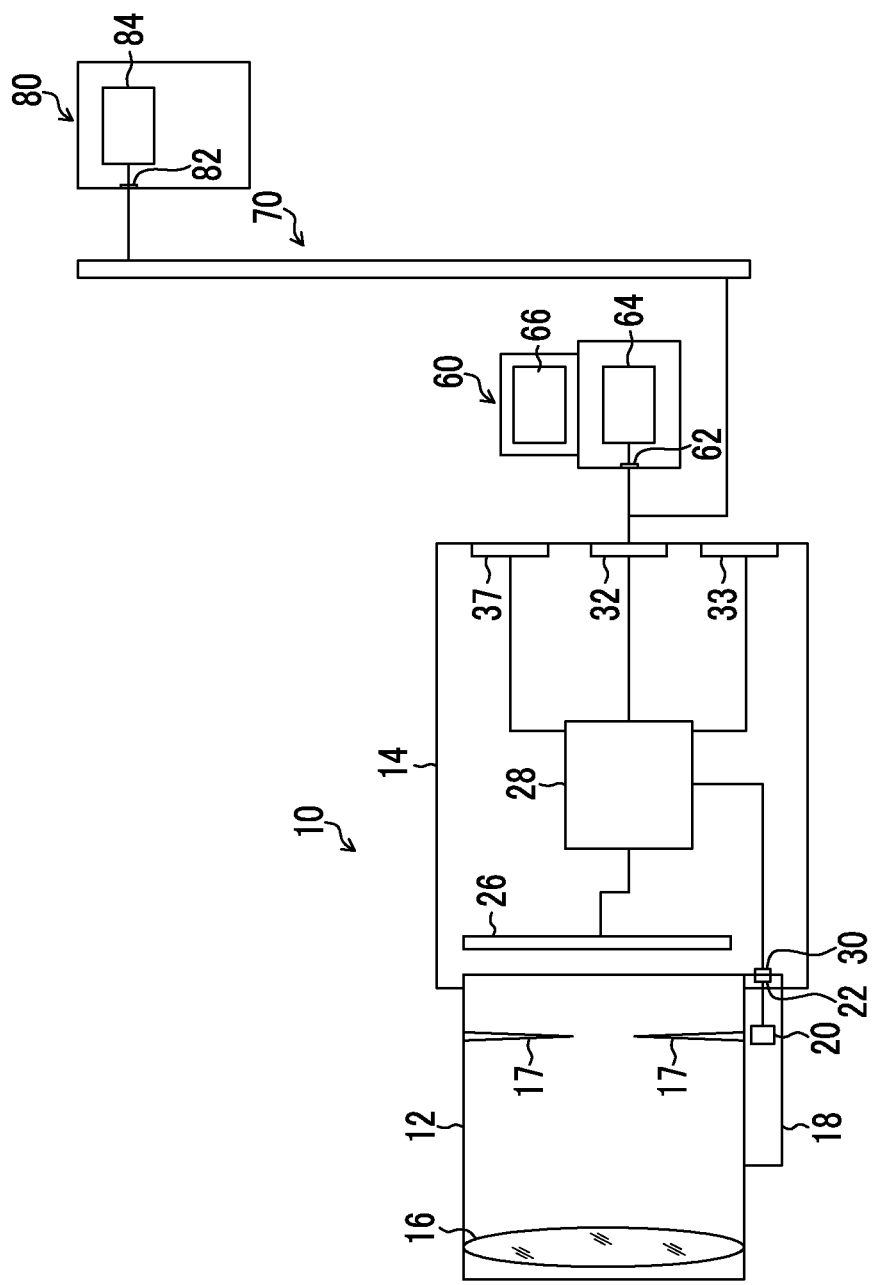
FIG. 1 is a block diagram showing the outline of a digital camera which is connected to a computer.

FIG. 1 is a block diagram showing the outline of the digital camera 10 which is connected to a computer 60.

The digital camera 10 includes an interchangeable optical system 12, and a camera body 14 including an imaging element 26, and the optical system 12 and the camera body 14 are electrically connected through an optical system input/output unit 22 of the optical system 12 and a camera body input/output unit 30 of the camera body 14.

The optical system 12 includes an optical member, such as a lens 16 or a diaphragm 17, and an optical system operating unit 18 which controls the optical member. The optical system operating unit 18 includes an optical system controller 20 which is connected to the optical system input/output unit 22, and an actuator (not shown) which operates the optical member. The optical system controller 20 controls the optical member through the actuator based on a control signal sent from the camera body 14 through the optical system input/output unit 22, and performs, for example, focus control or zoom control by lens movement, diaphragm amount control of the diaphragm 17, and the like.

The imaging element 26 has a condensing microlens, a color filter of RGB or the like, and an image sensor (a photodiode: complementary metal oxide semiconductor (CMOS), a charge coupled device (CCD), or the like). The imaging element 26 converts light of an object image captured by the optical system 12 to an electrical signal, and sends an image signal (source image data) to an image processing device of a camera body controller 28.

Figure 2:
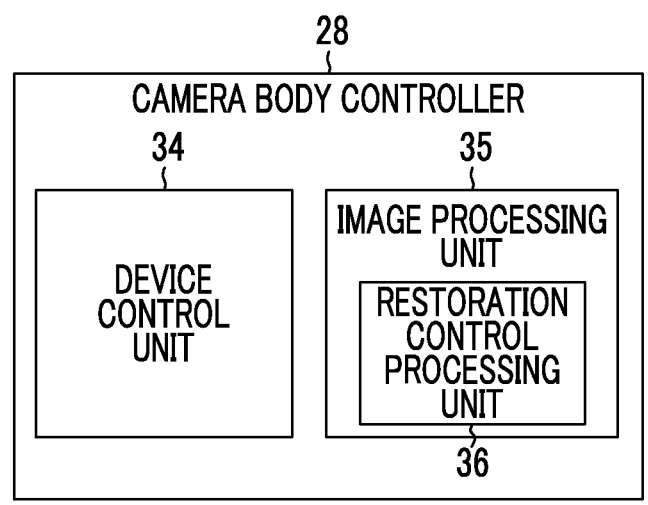
FIG. 2 is a block diagram showing a functional configuration example of a camera body controller.

The camera body controller 28 integrally controls the camera body 14, and as shown in FIG. 2, has a device control unit 34 and an image processing unit (image processing device) 35. For example, the device control unit 34 controls the output of the image signal (image data) from the imaging element 26, generates a control signal for controlling the optical system 12 and transmits the control signal to the optical system 12 (optical system controller 20) through the camera body input/output unit 30, and transmits image data (RAW data, JPEG data, or the like) before and after an image process to external devices (the computer 60 and the like) connected through an input/output interface 32. The device control unit 34 appropriately controls various devices in the digital camera 10, such as a display unit 33 (an electronic view finder (EVF) or a rear liquid crystal display unit).

The image processing unit 35 can subject an image signal from the imaging element 26 to an arbitrary image process as necessary. For example, various processes, such as a sensor correction process, a demosaic (synchronization) process, an image interpolation process, a color correction process (an offset correction process, a white balance process, a color matrix process, a gamma conversion process, and the like), an RGB image process (a sharpness process, a tone correction process, an exposure correction process, a contour correction process, and the like), an RGB/YCrCb conversion process, and an image compression process, are appropriately performed in the image processing unit 35. In addition, the image processing unit 35 of this example includes a restoration control processing unit 36 which subjects the image signal (source image data) to the restoration process (point image restoration process) based on the point spread function of the optical system 12. The details of the restoration process will be described.

The digital camera 10 shown in FIG. 1 includes other devices (a shutter and the like) necessary for photographing or the like, and the user can appropriately determine and change various settings for photographing or the like through a user interface 37 in the camera body 14. The user interface 37 is connected to the camera body controller 28 (the device control unit 34 and the image processing unit 35), and various settings determined and changed by the user are reflected in various processes in the camera body controller 28.

Image data subjected to the image process in the camera body controller 28 is sent to the computer 60 and the like connected to the input/output interface 32. The format of image data sent from the digital camera 10 (camera body controller 28) to the computer 60 and the like is not particularly limited, and an arbitrary format, such as RAW or MPEG-4, is used. When an image process of the invention described below is performed in the computer 60, in the digital camera 10, for example, a plurality of continuous filters in a time series are transmitted to the computer 60, and the image process is performed in the computer 60.

The computer 60 is connected to the digital camera 10 through the input/output interface 32 of the camera body 14 and a computer input/output unit 62, and receives data, such as image data, sent from the camera body 14. A computer controller 64 integrally controls the computer 60, and subjects image data from the digital camera 10 to an image process or controls communication with a server 80 or the like connected to the computer input/output unit 62 through a network line, such as the Internet 70.

The computer 60 has a display 66, and the process content in the computer controller 64 is displayed on the display 66 as necessary. The user operates input means (not shown), such as a keyboard, while confirming the display of the display 66, thereby inputting data or commands to the computer controller 64 and controlling the computer 60 or controlling the devices (the digital camera 10 and the server 80) connected to the computer 60.

The server 80 has a server input/output unit 82 and a server controller 84. The server input/output unit 82 constitutes a transmission/reception connection unit with external devices, such as the computer 60, and is connected to the computer input/output unit 62 of the computer 60 through a network line, such as the Internet 70. The server controller 84 cooperates with the computer controller 64 according to a control instruction signal from the computer 60, performs transmission and reception of data with the computer controller 64 as necessary, downloads data to the computer 60, and performs a calculation process and transmits the calculation result to the computer 60.

Each controller (the optical system controller 20, the camera body controller 28, the computer controller 64, and the server controller 84) includes circuits necessary for a control process, and includes, for example, an arithmetic processing circuit (CPU or the like), a memory, and the like. Communication among the digital camera 10, the computer 60, and the server 80 may be performed in a wired manner or in a wireless manner. The computer 60 and the server 80 may be constituted integrally, and the computer 60 and/or the server 80 may be omitted. A communication function with the server 80 may be provided in the digital camera 10, and transmission/reception of data may be performed directly between the digital camera 10 and the server 80.

Next, a restoration process of captured data (image data) of the object image obtained through the imaging element 26 will be described.

In this example, although an example where the restoration process is carried out in the camera body 14 (camera body controller 28) will be described, the whole or a part of the restoration process may be carried out in other controllers (the optical system controller 20, the computer controller 64, the server controller 84, and the like).

The restoration process is a process which subjects source image data acquired by photographing using the optical system 12 and the imaging element 26 to a restoration process using a restoration filter based on a point spread function of the optical system 12 to acquire recovered image data.

Figure 3:
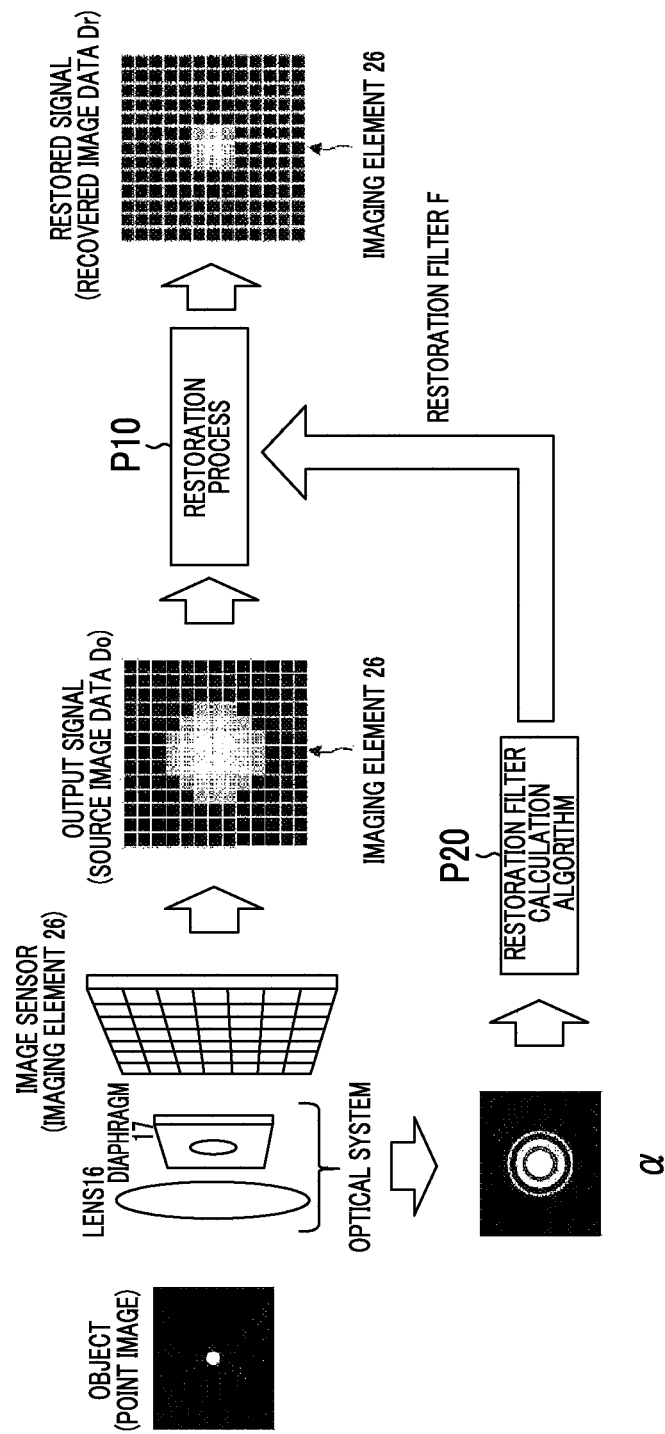
FIG. 3 is a diagram showing the outline from image photographing to a restoration process.

FIG. 3 is a diagram showing the outline from image photographing to a restoration process. When photographing a point image as an object, the object image is received by the imaging element 26 (image sensor) through the optical system 12, and source image data Do is output from the imaging element 26. Source image data Do becomes image data, in which an original object image is in a blurred state, by a point spread phenomenon resulting from the characteristic of the optical system 12.

In order to restore the original object image (point image) from source image data Do of the blurred image, source image data Do is subjected to a restoration process P10 using a restoration filter F, whereby recovered image data Dr representing an image (recovered image) closer to the original object image (point image) is obtained.

The restoration filter F used for the restoration process P10 is obtained from point image information (point spread function) of the optical system 12 according to the photographing conditions at the time of acquiring source image data Do by a predetermined restoration filter calculation algorithm P20. Symbol a in FIG. 3 represents point image information according to the photographing conditions, and the point spread function as the point image information of the optical system 12 fluctuates depending on various photographing conditions, such as a diaphragm amount, a focal distance, an object distance, an image height, a recording pixel number, and a pixel pitch, as well as the type of lens 16; thus, for calculating the restoration filter F, the photographing conditions are acquired.

Figure 4:
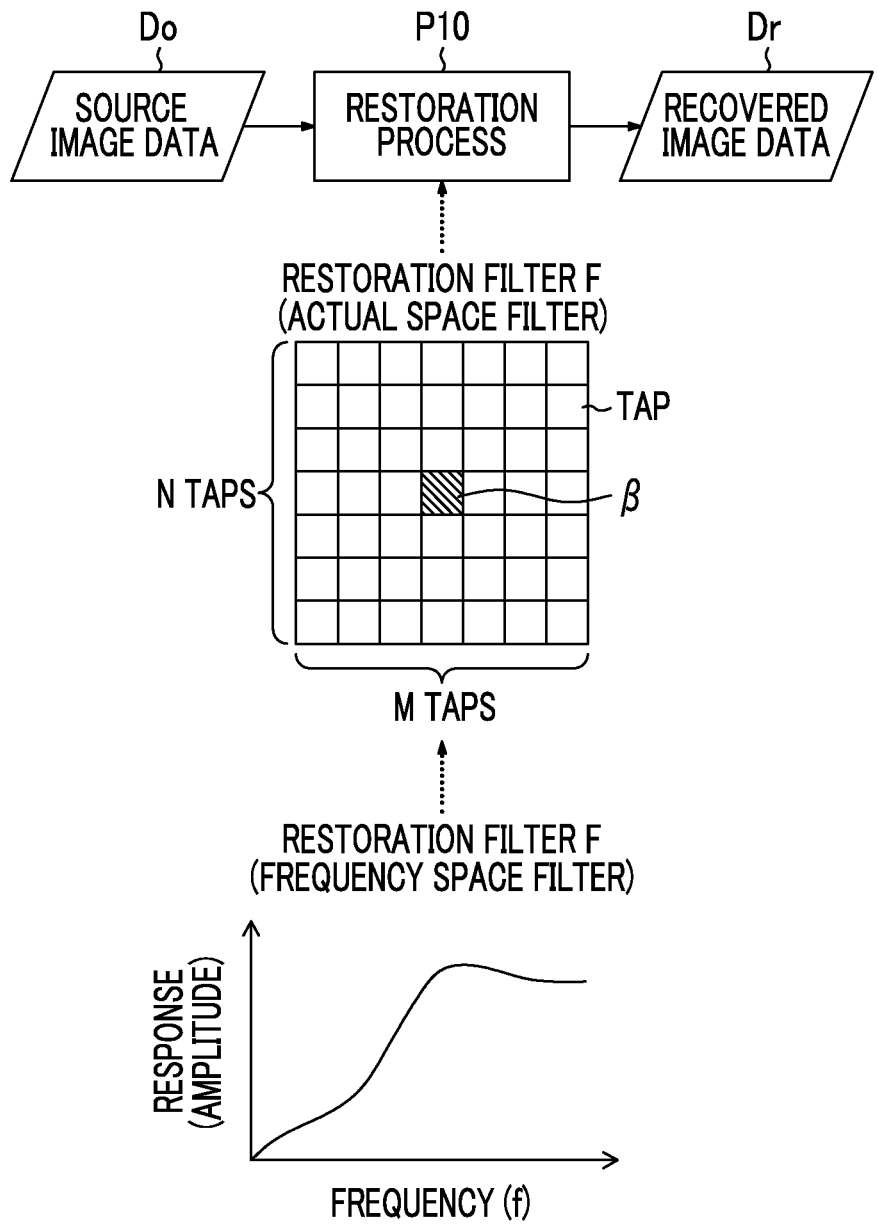
FIG. 4 is a block diagram showing the outline of an example of the restoration process.

FIG. 4 is a block diagram showing the outline of an example of the restoration process.

As described above, the restoration process (point image restoration process) P10 is a process which creates recovered image data Dr from source image data Do through a filtering process using the restoration filter F, and the restoration filter F on an actual space constituted of, for example, N×M (where N and M are integers equal to or greater than two) taps is applied to image data to be processed. With this, weighted average calculation (deconvolution calculation) of a filter coefficient allocated to each tap and corresponding pixel data (pixel data to be processed of source image data Do and adjacent pixel data) is performed, whereby pixel data (recovered image data Dr) after the restoration process can be calculated. The weighted average process using the restoration filter F is applied to all pixel data constituting image data while changing a target pixel in order, thereby performing the restoration process. Symbol in FIG. 4 represents a tap (filter coefficient) which is applied to pixel data to be processed.

The restoration filter on the actual space constituted of the N×M taps can be derived by inverse Fourier transform of a restoration filter on a frequency space. Accordingly, the restoration filter on the actual space can be appropriately calculated by specifying a restoration filter on a frequency space as the basis and designating the number of taps constituting the restoration filter of the actual space. The type of source image data to be subjected to the restoration process is not particularly limited, and may be, for example, color component data (color component signals of RGB or the like) or may be luminance data.

The above-described restoration process can also be performed for a plurality of images (moving image) photographed continuously. When the restoration process is performed for a moving image, the restoration process is performed for a plurality of continuous frames in a time series.

First Embodiment

Figure 5:
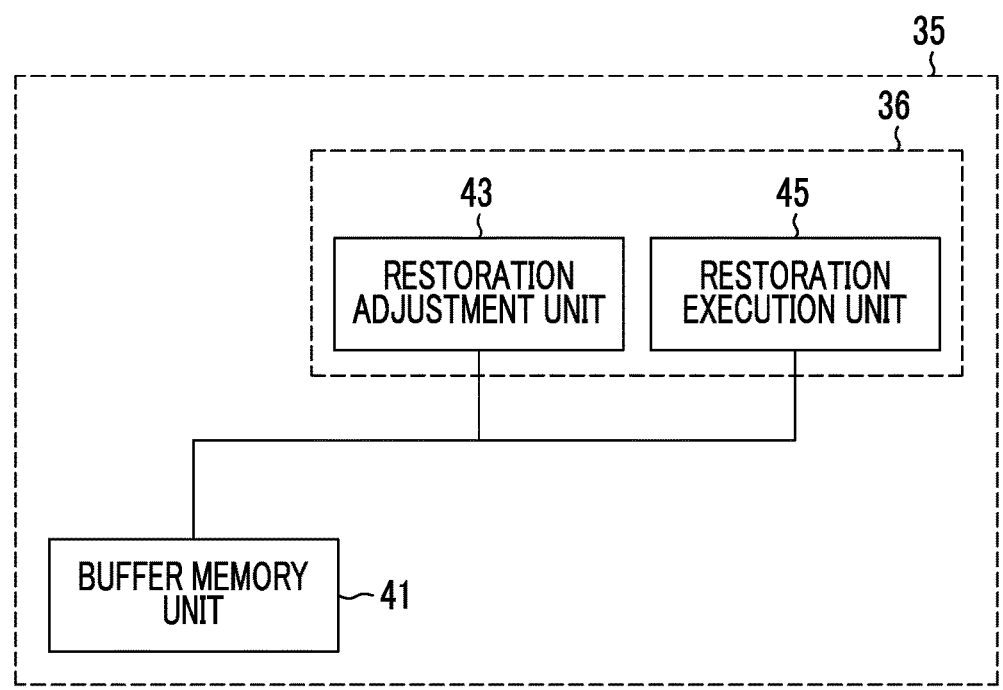
FIG. 5 is a block diagram showing an example of the functional configuration of an image processing unit in a first embodiment.

FIG. 5 is a functional block diagram relating to a restoration process for a moving image of a first embodiment, and shows various functional blocks constituted by the image processing unit 35 (see FIG. 2). The functional blocks in the drawing may not necessarily be provided separately, and a plurality of functional blocks may be realized by integrally configured hardware/software.

The image processing unit 35 includes a buffer memory unit 41 and a restoration control processing unit 36, and the restoration control processing unit 36 includes a restoration adjustment unit 43 and a restoration execution unit 45. The buffer memory unit 41 and the restoration control processing unit 36 (the restoration adjustment unit 43 and the restoration execution unit 45) can perform communication of data with each other.

The buffer memory unit 41 temporarily stores image data of a plurality of continuous frames in a time series acquired by photographing using the optical system 12 and the imaging element 26 and photographing condition information indicating the photographing conditions (diaphragm value, focal distance, object distance, and the like) at the time of photographing of each frame. Then, in the image processing unit 35, various processes are performed for image data stored in the buffer memory unit 41. For the buffer memory unit 41, for example, a random access memory (RAM) is used. Image information (image data) of each frame and photographing condition information are referred to as photographing information of each frame.

The restoration adjustment unit 43 adjusts the content of a restoration process which is performed by the restoration execution unit 45. That is, the restoration adjustment unit 43 controls a restoration process for a frame to be processed based on imaging information of a reference frame including a frame after the frame to be processed in a time series. The "frame to be processed" used herein is a frame where the restoration process is performed, and the "reference frame" is a frame where information relating to the adjustment of the content of the restoration process of the frame to be processed is obtained. Furthermore, "the content of the restoration process" is responsible for the effect of the restoration process, and refers to, for example, a filter coefficient of a restoration filter or a coefficient relating to a gain.

Figure 6:
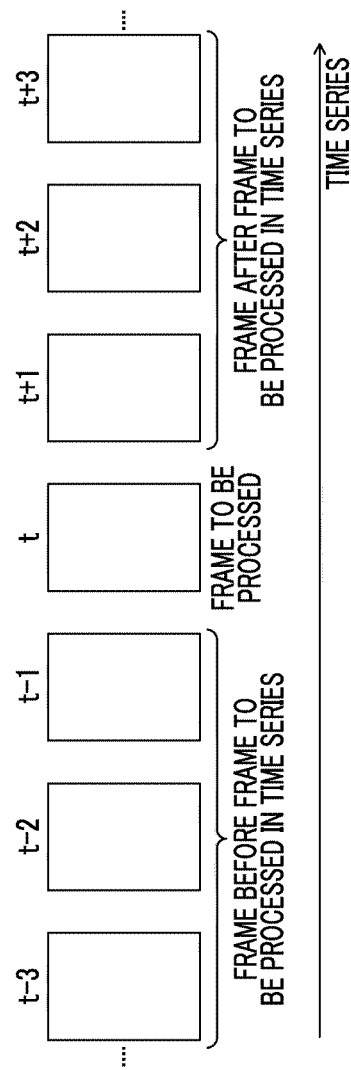
FIG. 6 is a diagram illustrating an example of a frame to be processed and a reference frame.

FIG. 6 is a diagram illustrating the "frame to be processed" and the "reference frame".

At the time of imaging of a moving image, an object is continuously imaged at a predetermined frame rate through the optical system 12 and the imaging element 26, and image data of a moving image having a plurality of continuous frames in a time series is acquired. The frame rate used herein is the number of frames (the number of images, the number of pieces) per unit time, and is generally represented by the number of frames (unit: frame per second (fps)) generated per second. For example, the digital camera 10 of this aspect generates 30 images per second when the frame rate is 30 fps, and generates 60 images per second when the frame rate is 60 fps.

A moving image is constituted of a plurality of continuous frames in a time series, and has a meaning including, for example, a recorded moving image and a live view image.

FIG. 6 shows a case where a restoration process is performed for a frame (t) imaged at a time t. In this case, the frame (t) becomes a frame to be processed. Then, a frame (t−1) imaged at a time t−1, a frame (t−2) imaged at a time t−2, and a frame (t−3) imaged at a time t−3 are frames before the frame to be processed in a time series. A frame (t+1) imaged at a time t+1, a frame (t+2) imaged at a time t+2, and a frame (t+3) imaged at a time t+3 are frames after the frame to be processed in a time series. In FIG. 6, for convenience of description, although only three frames are described as the frames before the frame to be processed in a time series and only three frames are described as the frames after the frame to be processed in a time series, actually, many frames exist according to a photographing time.

The reference frame may include at least one of the frames after the frame to be processed (frame (t)) in a time series. A single or a plurality of reference frames may be available. For example, when a single reference frame is available, the frame (t+1) which is a frame after the frame to be processed (frame (t)) in a time series is selected as the reference frame. Furthermore, when a plurality of reference frames are available, the frame (t+1) which is a frame after the frame to be processed (frame (t)) in a time series and the frame (t+1) which is a frame before the frame to be processed (frame (t)) in a time series are selected.

In FIG. 6, the frame (t−1) is a frame immediately before the frame to be processed in a time series, and the frame (t+1) is a frame immediately after the frame to be processed. The preceding frame (frame (t−1)) or the succeeding frame (frame (t+1)) may be selected as the reference frame.

As a method of selecting the reference frame from among a plurality of continuous frames in a time series, various methods are used. For example, as a method of selecting the reference frame, a method in which the user designates a method of selecting the reference frame with the user interface 37 in advance is considered. Furthermore, for example, a method of selecting the reference frame may be determined in advance.

The restoration adjustment unit 43 adjusts the content of the restoration process of the frame to be processed based on the imaging information of the reference frame. In order to realize a restoration process with continuity between the frames, the restoration adjustment unit 43 adjusts the contents of the restoration process based on the imaging information of the reference frame using various methods.

In addition, the restoration adjustment unit 43 can adjust the content of the restoration process of the frame to be processed based on the imaging information of the reference frame and the imaging information of the frame to be processed. The restoration process of the frame to be processed is performed based on the imaging information of the frame to be processed and the imaging information of the reference frame, whereby it is possible to perform the restoration process with continuity between the frame to be processed and the reference frame and to perform the restoration process suitable for the frame to be processed.

Next, a method of adjusting the content of the restoration process which is performed by the restoration adjustment unit 43 will be described using a specific example.

The restoration adjustment unit 43 can adjust the content of the restoration process based on a mode value with regard to the imaging information of the reference frame.

FIG. 7 shows a case where a diaphragm value (F value) is given as photographing condition information (imaging information) in each of the frame (t−3) to the frame (t+3) described referring to FIG. 6. Specifically, in the case shown in FIG. 7, the frame (t−3) is imaged with a diaphragm value F2, the frame (t−2) is imaged with the diaphragm value F2, the frame (t−1) is imaged with the diaphragm value F2, the frame (t) is imaged with a diaphragm value F2.8, the frame (t+1) is imaged with the diaphragm value F2, the frame (t+2) is imaged with the diaphragm value F2, and the frame (t+3) is imaged with the diaphragm value F2.

A case where the frame to be processed is the frame (t−1), and the reference frames are the frame (t−3), the frame (t−2), the frame (t), and the frame (t+1) will be described. In this case, the frame (t−3), the frame (t−2), the frame (t−1), and the frame (t+1) are imaged with the diaphragm value F2, and the frame (t) is imaged with the diaphragm value F2.8. For this reason, in the frame to be processed and the reference frames, the mode value of the diaphragm values as the photographing condition information becomes F2. Then, when the restoration process is performed for the frame to be processed (frame (t−1)), a restoration filter for a frame imaged with the diaphragm value F2 is used.

Similarly, when the frame to be processed is the frame (t) and the frame (t+1), the mode value of the diaphragm values of the five preceding and succeeding frames including the frame to be processed becomes F2, and for any frame to be processed, a restoration filter for a frame imaged with the diaphragm value F2 is used.

FIG. 8 shows an example where other reference frames are selected. The frame (t−3) is imaged with the diaphragm value F2, the frame (t−2) is imaged with the diaphragm value F2, the frame (t−1) is imaged with the diaphragm value F2, the frame (t) is imaged with the diaphragm value F2.8, the frame (t+1) is imaged with a diaphragm value F1.4, the frame (t+2) is imaged with the diaphragm value F1.4, and the frame (t+3) is imaged with the diaphragm value F1.4.

When the frame (t−2), the frame (t−1), the frame (t+1), and the frame (t+2) are the reference frames, and the frame (t) is the frame to be processed, since the frame (t−2) and the frame (t−1) are imaged with the diaphragm value F2, and the frame (t+1) and the frame (t−2) are imaged with the diaphragm value F1.4, the mode value of the photographing condition information becomes two of the diaphragm value F2 and the diaphragm value F1.4. In this case, since the photographing condition information of the frame to be processed is the diaphragm value F2.8, the photographing condition information of the frame to be processed does not correspond to the mode value; thus, the mode value (in this case, the diaphragm value F1.4) of the photographing condition information of the reference frame after the frame to be processed in a time series is used.

When the frame (t−1) and the frame (t+3) are the reference frames, the mode value of the photographing condition information becomes two of F2 and F1.4; however, since the frame (t−1) is closer to the frame to be processed than the frame (t+3) in a time series, the diaphragm value F2 as the photographing condition information of the frame (t−1) is used as the mode value.

Figure 9:
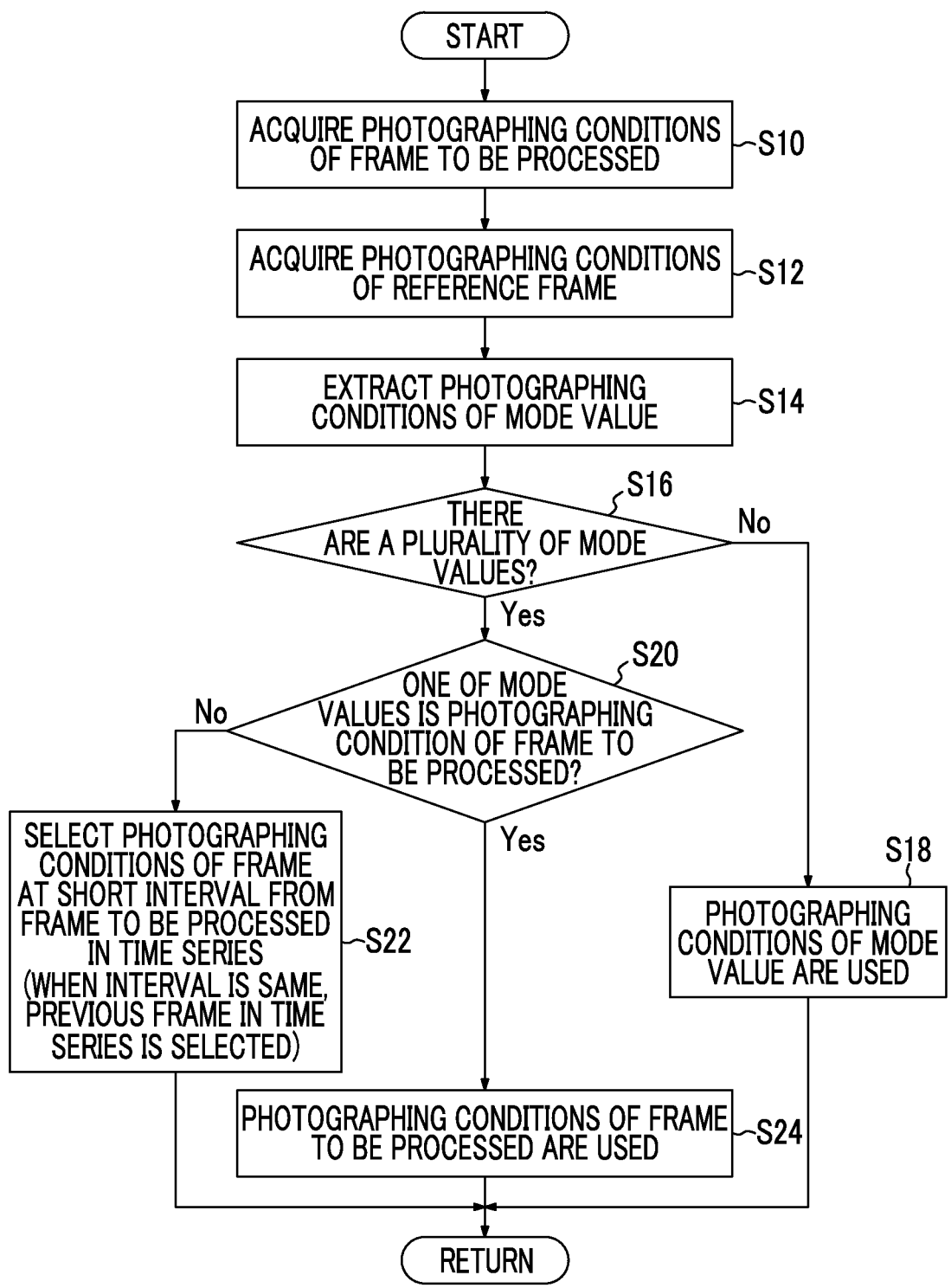
FIG. 9 is a diagram showing an operation flow of the restoration adjustment unit when determining a mode value.

FIG. 9 is a diagram showing an operation flow in which the restoration adjustment unit 43 determines the mode value of the photographing condition information (imaging information) of the reference frame.

First, the restoration adjustment unit 43 acquires the photographing condition information of the frame to be processed (Step S10). Thereafter, the restoration adjustment unit 43 acquires the photographing condition information of the reference frame (Step S12). The restoration adjustment unit 43 can acquire the photographing condition information of the frame to be processed using various methods, and for example, the restoration adjustment unit 43 can acquire the photographing condition information of the frame to be processed from the device control unit 34. Then, the restoration adjustment unit 43 extracts the mode value among the photographing condition information of the reference frame (Step S14). Then, the restoration adjustment unit 43 determines whether or not a single or a plurality of mode values are available, when the mode value is single (in Step S16, No), the photographing conditions of the mode value are used (Step S18), and the content of the restoration process is adjusted.

When a plurality of mode values are available (in Step S16, Yes), it is determined whether or not one of a plurality of mode values is the photographing condition information of the frame to be processed. When one of a plurality of mode values is not the photographing condition information of the frame to be processed (in Step S20, No), the restoration adjustment unit 43 selects a mode value of a frame close to the frame to be processed in a time series among a plurality of mode values (Step S22). When any mode value among a plurality of mode values is at the same interval with respect to the frame to be processed in a time series, the restoration adjustment unit 43 selects a mode value including a frame before the frame to be processed in a time series (Step S22). In this way, the mode value including the frame before the frame to be processed in a time series is selected, whereby continuity in a time series is improved.

When one of a plurality of mode values is the photographing condition information of the frame to be processed (in Step S20, Yes), the restoration adjustment unit 43 uses the photographing condition information of the frame to be processed as the mode value (Step S24). Thereafter, the process is performed for the next frame to be processed.

Next, another method of adjusting the content of the restoration process which is performed by the restoration adjustment unit 43 will be described using a specific example.

The restoration adjustment unit 43 may acquire a new restoration filter based on a restoration filter corresponding to the photographing condition information of the frame to be processed and a restoration filter corresponding to the photographing condition information of the reference frame. The restoration adjustment unit 43 can acquire a new restoration filter from a filter corresponding to the photographing condition information of the frame to be processed and a filter corresponding to the photographing condition information of the reference frame using various methods.

FIGS. 10A to 10D are diagrams illustrating a case where a new restoration filter is determined by a weighted average of a frame corresponding to the photographing condition information of the frame to be processed and a frame corresponding to the photographing condition information of the reference frame.

FIG. 10A shows a restoration filter and a filter coefficient for a still image corresponding to the photographing conditions of the frame (t−1) described referring to FIG. 6. FIG. 10B shows a restoration filter and a filter coefficient for a still image corresponding to the photographing conditions of the frame (t) described referring to FIG. 6. FIG. 10C shows a restoration filter and a filter coefficient for a still image corresponding to the photographing conditions of the frame (t+1) described referring to FIG. 6.

The restoration filter coefficient of FIG. 10A is weighted by W(t−1), the restoration filter coefficient of FIG. 10B is weighted by W(t), and the restoration filter coefficient of FIG. 10C is weighted by W(t+1). Weighting can be arbitrarily performed, and for example, since W(t) corresponds to the frame to be processed, W(t) can be set to be greater than W(t−1) and W(t+1) corresponding to other reference frames. Furthermore, W(t), W(t−1), and W(t+1) may be set by the user with the user interface 37, or may be set in advance.

FIG. 10D shows a restoration filter and a restoration filter coefficient for a moving image for use in the restoration process of the frame to be processed. The restoration filter and the restoration filter coefficient for a moving image indicate a restoration filter coefficient calculated from a weighted average of the restoration filter coefficient corresponding to the photographing condition information of the frame to be processed and the restoration filter coefficient corresponding to the photographing condition information of the reference frame. Specifically, the restoration adjustment unit 43 obtains a weighted average by multiplying the restoration filter coefficient shown in FIG. 10A by W(t+1), multiplying the restoration filter coefficient shown in FIG. 10B by W(t+1), and multiplying the restoration filter coefficient shown in FIG. 10C by W(t−1), and generates a restoration filter (a restoration filter for a moving image) with the filter coefficient for a moving image shown in FIG. 10D. Then, the restoration execution unit 45 performs the restoration process for the frame to be processed using the generated restoration filter (FIG. 10D).

Figure 11:
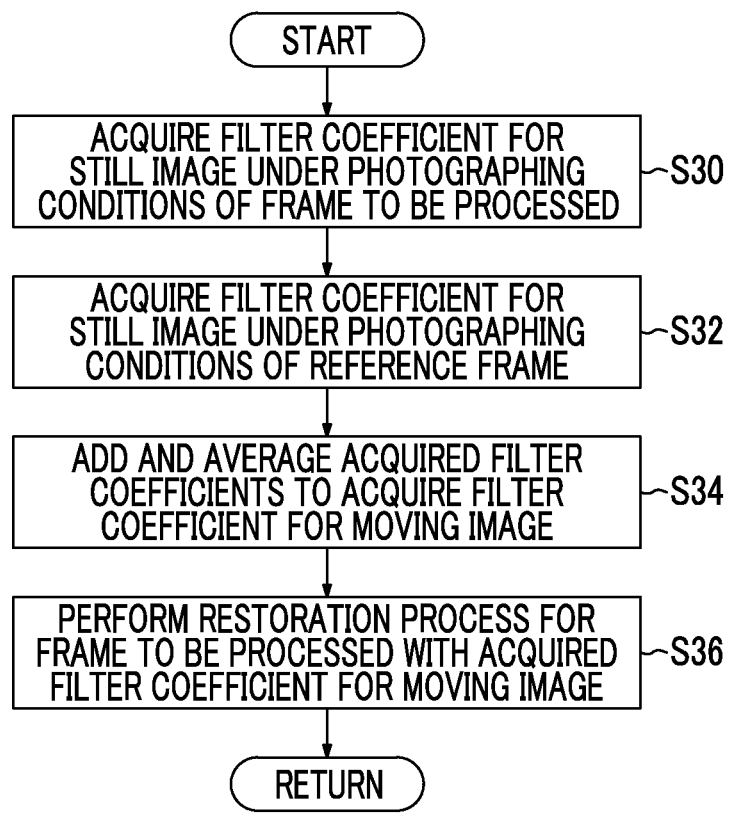
FIG. 11 is a diagram of an operation flow of the restoration adjustment unit when generating a new restoration filter by weighting and averaging coefficients of restoration filters.

FIG. 11 is a diagram showing an operation flow of the restoration adjustment unit 43 when the restoration adjustment unit 43 acquires a filter based on the restoration filter of the frame to be processed and the restoration filter of the reference frame.

First, the restoration adjustment unit 43 acquires a filter coefficient for a still image according to the photographing condition information of the frame to be processed (Step S30). Then, the restoration adjustment unit 43 acquires a filter coefficient for a still image according to the photographing condition information of the reference frame (Step S32). The restoration adjustment unit 43 stores a plurality of filters according to the respective pieces of photographing condition information in advance, and the restoration adjustment unit 43 can acquire a filter coefficient or a filter as necessary.

Thereafter, the restoration adjustment unit 43 obtains a weighted average of the filter coefficient for a still image according to the photographing condition information of the frame to be processed and the filter coefficient for a still image according to the photographing condition information of the reference frame, and acquires a filter coefficient for a moving image (Step S34). Then, the restoration execution unit 45 performs a restoration process for the frame to be processed with a restoration filter based on the acquired filter coefficient for a moving image (Step S36). Thereafter, a filter coefficient for a still image is acquired in the photographing condition information of the next frame to be processed.

In FIGS. 10A to 10D and 11 described above, the filter coefficient for a moving image is determined by weighting and averaging the filter coefficients for a still image, and the restoration process is performed for the frame to be processed with the restoration filter based on the filter coefficient for a moving image. (Expression 1) is an expression representing the restoration process described referring to FIGS. 10A to 10D and 11. Ave represents a weighted average, K(t) is a filter coefficient for a still image at a time t, Val(t) represents image data at the time t, and * represents convolution integration (convolution).

$$\text{recovered image data of frame to be processed} = \text{Ave}(K(t+1), K(t), K(t-1)) * \text{Val}(t) \quad \text{(Expression 1)}$$

In the above-described aspect, a new filter coefficient for a moving image is acquired by a weighted average of the filter coefficient for a still image of the frame to be processed and the filter coefficient for a still image of the reference frame, and the restoration process is performed for the frame to be processed using the filter coefficient for a moving image. With this, in the above-described aspect, it is possible to perform an image process of a moving image with favorable continuity according to the importance of the frames. Furthermore, in the above-described aspect, it is possible to perform a favorable image process even in a moving image where an object moves.

Figure 12:
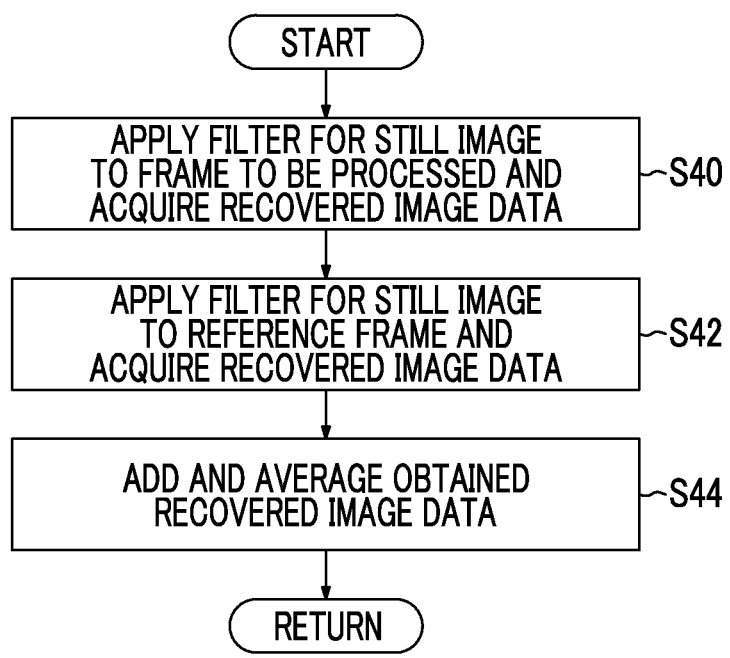
FIG. 12 is a diagram of an operation flow of the restoration adjustment unit when acquiring recovered image data by weighting and averaging image data.

The restoration adjustment unit 43 can perform the restoration process for the frame to be processed using the weighted average through the process shown in FIG. 12.

FIG. 12 is a diagram showing an operation flow of the restoration adjustment unit 43 when recovered image data of the frame to be processed is acquired based on image data acquired through the restoration process for the frame to be processed in the restoration adjustment unit 43 and image data acquired through the restoration process for the reference frame in the restoration adjustment unit 43.

First, the restoration execution unit 45 executes the restoration process for the frame to be processed with the filter for a moving image according to the photographing condition information of the frame to be processed, and the restoration adjustment unit 43 acquires image data (Step S40). Thereafter, the restoration execution unit 45 executes the restoration process for the reference frame with the filter for a moving image according to the photographing condition information of the reference frame, and the restoration adjustment unit 43 acquires image data (Step S42). Thereafter, the restoration adjustment unit 43 can acquire recovered image data using a weighted average relating to the frame to be processed by weighting and averaging recovered image data corresponding to the frame to be processed and recovered image data corresponding to the reference frame (Step S44). Expression 2 is an expression representing this restoration process.

recovered image data of frame to be processed=Ave (Val($t$+1)$K^*$($t$+1),Val($t$)*$K$($t$),Val($t$−1)*$K$($t$−1))  (Expression 2)

In the above-described aspect, the weighted average of recovered image data corresponding to the frame to be processed and recovered image data corresponding to the reference frame is obtained, and recovered image data becomes recovered image data of the frame to be processed. With this, in the above-described aspect, it is possible to perform an image process of a moving image with favorable continuity according to the importance of the frames.

Figure 13:
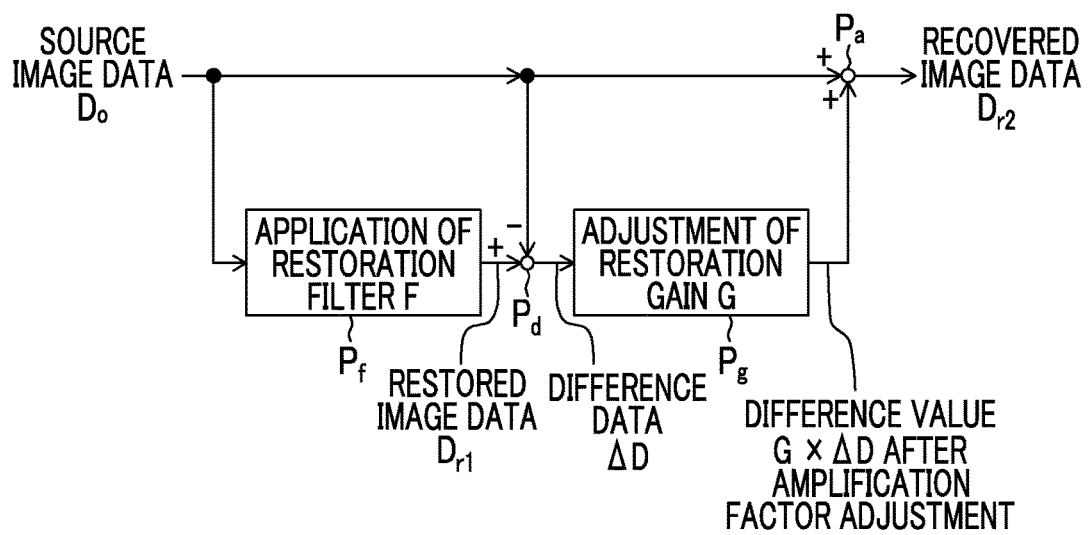
FIG. 13 is an example of a control block diagram of the restoration execution unit.

FIG. 13 is a control block diagram showing a restoration process example in the restoration execution unit 45.

First, the restoration filter F is applied to source image data Do (filter application process $P_f$) (filter application unit), and restored image data Dr1 is calculated. The restoration filter F which is applied to source image data Do is not particularly limited as long as the restoration filter F is based on the point spread function (PSF, OTF, MTF, PTF, or the like) of the optical system 12 (the lens 16, the diaphragm 17, or the like), and may be an actual space filter or a frequency space filter.

Thereafter, the difference of image data before and after the restoration process is derived (difference derivation process $P_d$), and the adjustment of the amplification factor (restoration gain) to the difference is performed (gain adjustment process $P_g$) (gain adjustment unit). That is, in the difference derivation process $P_d$, difference data $\Delta D$ ($\Delta D$=Dr1−Do) between restored image data Dr1 passing through the filter application process $P_f$ and source image data Do is calculated. In the gain adjustment process $P_g$, the adjustment of the amplification factor (restoration gain) G of difference data $\Delta D$ is performed to calculate the difference value (G×$\Delta D$) after amplification factor adjustment, and an addition process $P_a$ of the difference value (G×$\Delta D$) after amplification factor adjustment and source image data Do is performed to calculate recovered image data Dr2 (Dr2=Do+G×$\Delta D$). As the restoration process, another method similar to the above-described method may be used, and for example, the following process may be performed. The restoration filter F is applied to source image data Do (filter application process $P_f$), and restored image data Dr1 is calculated. Thereafter, as the gain adjustment process $P_g$, the adjustment of the amplification factor (restoration gain) G to restored image data Dr1 is performed (Dr1×G), and the addition process $P_a$ of this value and a value obtained by multiplying source image data Do by (1−G) may be performed to calculate recovered image data Dr2.

In this way, the restoration intensity of the restoration process fluctuates according to the restoration filter (filter coefficient) in the filter application process $P_f$ and the amplification factor (restoration gain) G in the gain adjustment process $P_g$. For this reason, the adjustment of the restoration intensity of the restoration process can be executed by "switching the restoration filter (filter coefficient) for use in the filter adjustment process $P_f$" and/or "changing the amplification factor (restoration gain) G in the gain adjustment process $P_g$".

Accordingly, the restoration execution unit 45 can adjust the restoration intensity of the restoration process by adjusting the filter coefficient of the restoration filter F or adjusting the restoration gain G.

The restoration process which is performed for the frame to be processed based on the imaging information of the reference frame may not be executed for a live view image. That is, the restoration adjustment unit 43 may perform control such that, in regard to the restoration process for the frame to be processed among a plurality of frames constituting the live view image, the restoration process is performed based on the imaging information of the frame to be processed without depending on the imaging information of the reference frame.

Since live view display is a function requiring display close to real time, in particular, instantaneous display is given priority over controlling the restoration process with reference to the photographing information of the reference frame photographed later in a time series, and in many cases, it is desirable to display a moving image with good responsiveness to a change in an object. In a recorded moving image, since display close to real time is not required in order to reproduce and confirm the recorded moving image, and it is desirable to acquire image quality with favorable continuity with priority, the restoration process may be controlled with reference to the photographing information of the later reference frame in a time series.

The restoration adjustment unit 43 can perform the above-described restoration process only for a recorded moving image without performing the restoration process based on the point spread function of the optical system for the live view image. With this, in addition, in the live view image, it is possible to acquire a moving image with good responsiveness to a change in the object.

As described above, in the first embodiment described above, the restoration process which is performed for the frame to be processed is performed based on the imaging information of the reference frame. With this, it is possible to acquire a moving image with favorable image quality while maintaining continuity of the restoration process between the frames even if there is "a rapid change of a photographing environment".

Second Embodiment

In this embodiment, the process content of the restoration process is changed based on motion of the object, thereby performing a more appropriate restoration process even for a moving image where an object moves.

In this embodiment, description of the same configuration and action as in the first embodiment described above will not be repeated.

Figure 14:
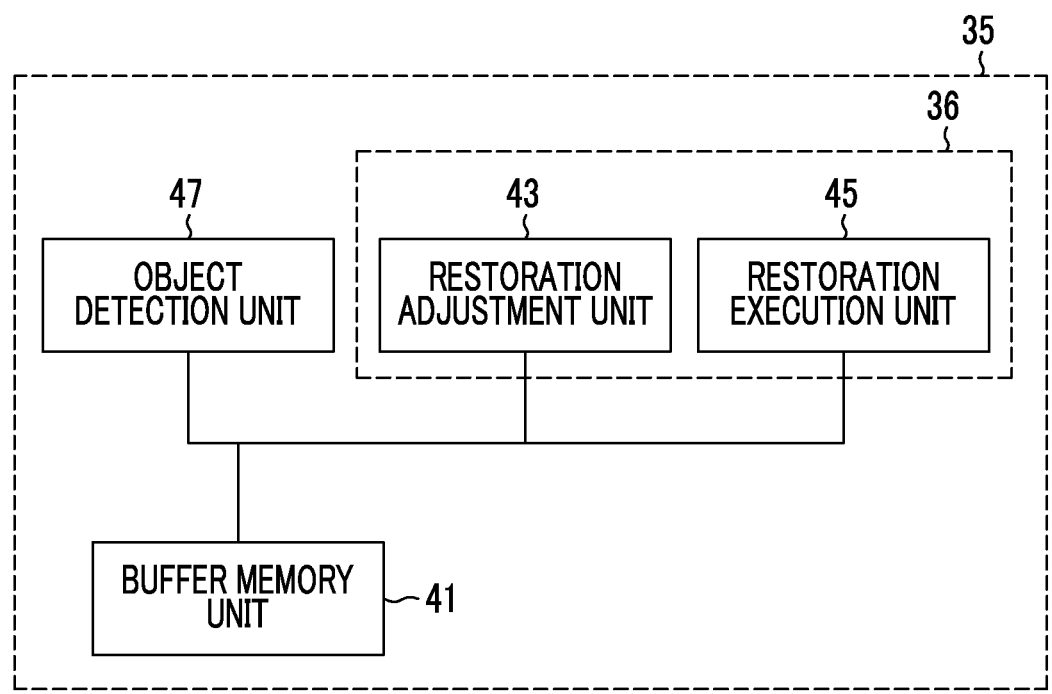
FIG. 14 is a block diagram showing an example of the functional configuration of an image processing unit in a second embodiment.

FIG. 14 is a functional block diagram relating to a restoration process of a second embodiment, and shows various functional blocks constituted by the image processing unit 35 (see FIG. 2).

The image processing unit 35 includes a buffer memory unit 41, a restoration control processing unit 36, and an object detection unit 47, and the buffer memory unit 41, the restoration control processing unit 36, and the object detection unit 47 can perform communication of data with one another.

The object detection unit 47 detects motion of an object (main object) in a moving image having a plurality of continuous frames in a time series. That is, the object detection unit 47 detects motion of the object from image data temporarily stored in the buffer memory unit 41 and detects whether the motion amount is equal to or greater than a threshold value, or less than the threshold value.

The detection of motion of the object in the object detection unit 47 can be performed using various methods, and for example, the object detection unit 47 can detect motion of the object by analyzing the moving image. Furthermore, the motion amount is not particularly limited as long as motion of an object image in the moving image is expressed quantitatively. For example, the number of pixels where the object image moves for a predetermined time (for example, each frame) may be set as the motion amount. In this case, the threshold value can be set to, for example, the number of pixels which is ¼ of the short side of the image.

The restoration adjustment unit 43 acquires information relating to motion of the object from the object detection unit 47 and changes the restoration process of the frame to be processed based on the acquired information relating to motion of the object. Specifically, when the motion amount of the object is equal to or greater than the threshold value, the restoration adjustment unit 43 performs the restoration process using a filter calculated from the weighted average of the restoration filter corresponding to the photographing condition information of the frame to be processed and the restoration filter corresponding to the photographing condition information of the reference frame (see FIGS. 10A to 10D and 11). When the motion amount of the object is less than the threshold value, the restoration adjustment unit 43 sets image data calculated from a weighted average of image data calculated by applying the restoration filter corresponding to the photographing condition information of the frame to be processed to the frame to be processed and image data calculated by applying the restoration filter corresponding to the photographing condition information of the reference frame to the reference frame as recovered image data of the frame to be processed (see FIG. 12).

As described above, in the second embodiment described above, the content of the restoration process is distinguished between a case where a restoration filter is newly generated based on motion of the object and the restoration process is performed to determine recovered image data relating to the frame to be processed and a case where recovered image data relating to the frame to be processed is determined by the weighted average of recovered image data of the frame to be processed and recovered image data of the reference frame. With this, in this aspect, it is possible to perform a favorable image process based on motion of the object even for a moving image where an object moves.

Third Embodiment

In this embodiment, the restoration adjustment unit 43 performs the adjustment of the restoration process based on the image information of the frame to be processed and the reference frame.

In this embodiment, description of the same configuration and action as in the first embodiment described above will not be repeated. A region Q which is unsuitable for the restoration process refers to a region having characteristics such that image quality is deteriorated if the restoration process is performed. For example, the region Q which is unsuitable for the restoration process is a defocus (not focused on the object) region. That is, since image quality is deteriorated if the restoration process is performed for the defocus region, the defocus region is the region Q which is unsuitable for the restoration process.

For example, as the region Q which is unsuitable for the restoration process, a region where a saturated pixel is detected is considered. That is, if the restoration process is performed for a region where a saturated pixel is detected, ringing occurs, and image quality of the moving image is deteriorated.

The restoration adjustment unit 43 analyzes an image of a plurality of continuous frames in a time series temporarily stored in the buffer memory unit 41 as the imaging information to acquire the image information. Specifically, the restoration adjustment unit 43 analyzes the moving image to acquire information regarding whether or not a saturated pixel is included in the frame to be processed and the reference frame and/or information regarding whether or not a defocus region is included in the frame to be processed and the reference frame. In other words, the restoration adjustment unit 43 determines whether or not a saturated pixel is included in the frame to be processed and the reference frame and/or whether or not a defocus region is included in the frame to be processed and the reference frame through moving image analysis.

A way to acquire information regarding whether or not a saturated pixel is included in the frame to be processed and the reference frame is not particularly limited, and for example, the restoration adjustment unit 43 can detect a saturated pixel using a photometric value or a peak value of image data. A way to acquire information regarding whether or not a defocus region is included in the frame to be processed and the reference frame is not particularly limited, and for example, the restoration adjustment unit 43 may detect a defocus region using an evaluation vale of auto focus (AF).

Figure 15:
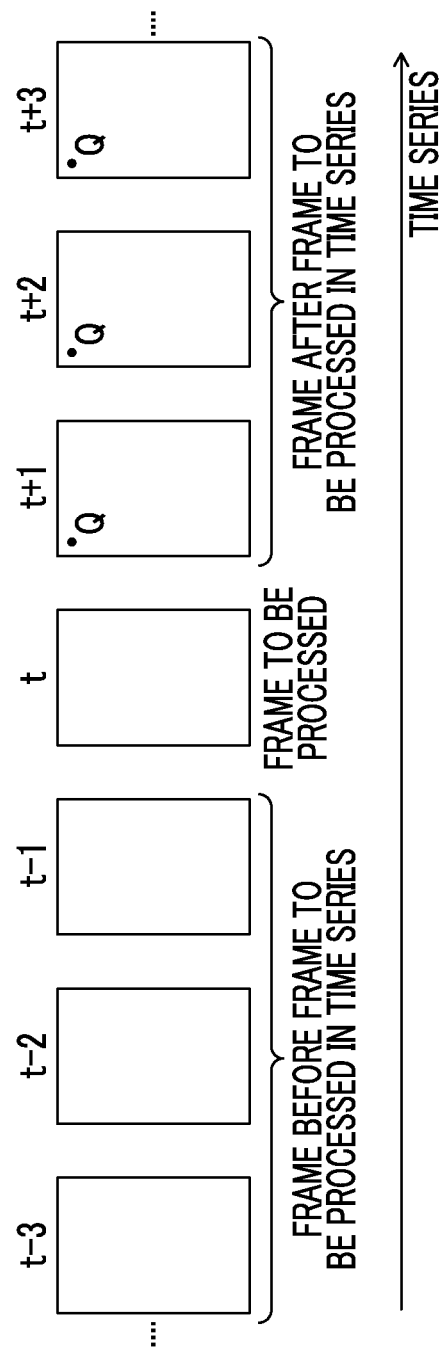
FIG. 15 is a diagram illustrating a restoration process based on image information in a third embodiment.

FIG. 15 shows a case where there is the region Q which is unsuitable for the restoration process in the frame (t+1) at the time t+1, the frame (t+2) at the time t+2, and the frame (t+3) at the time t+3 in the case described referring to FIG. 6.

In FIG. 15, a case where the frame (t) is selected as the frame to be processed and the frame (t+1) which is a frame after the frame to be processed in a time series is selected as the reference frame will be described.

When an image process is performed without consideration of continuity of the restoration process, in the frame (t), since the region Q which is unsuitable for the restoration process is not detected, the normal restoration process is performed. That is, the restoration process when the region Q which is unsuitable for the restoration process does not exist is performed. Meanwhile, in the frame (t+1), since there is a region (Q in FIG. 15) where the region Q which is unsuitable for the restoration process exists, the restoration process is performed in the frame (t+1) using the restoration filter when there is a region which is unsuitable for the restoration process. Then, since the restoration filter for use in the restoration process is different between the frame (t) and the frame (t+1), a rapid change may occur in the restoration process, and continuity of the restoration process may be degraded.

Accordingly, in this aspect, when it is determined that the region Q which is unsuitable for the restoration process exists in at least one of the frame to be processed and the reference frame, the restoration adjustment unit 43 performs adjustment based on the imaging information (image information) of the reference frame such that the restoration process is performed for the frame to be processed.

Specifically, in the case shown in FIG. 15, if it is determined that the region Q which is unsuitable for the restoration process is included in the frame (t+1) (reference frame), the restoration adjustment unit 43 newly generates a restoration filter by mixing the filter coefficient of the normal restoration filter for use in the frame (t) (frame to be processed) and the filter coefficient of the restoration filter for use in the frame (t+1) (reference frame) when a region which is unsuitable for the restoration process. Then, the restoration execution unit 45 performs the restoration process for the frame to be processed using the generated restoration filter. With this, a change in the content of the restoration process between the frame to be processed and the reference frame is suppressed, and it is possible to appropriately perform a restoration process.

As a way to mix the restoration filter coefficients, various methods can be used, and for example, a new filter coefficient can be determined by weighting and averaging the restoration filter coefficients.

When the region Q which is unsuitable for the restoration process is included in the reference frame, the restoration intensity of the restoration process for the frame to be processed may be adjusted based on the imaging information of the reference frame where the region Q which is unsuitable for the restoration process is included.

When an image process is performed without consideration of continuity of the restoration process, the restoration intensity of the restoration process is weakened for a frame where the region Q which is unsuitable for the restoration process is included, and the restoration process is performed with normal intensity for a frame where the region Q which is unsuitable for the restoration process is not included. However, such a restoration process is not preferable for a moving image where the restoration intensity of the restoration process is different between a frame where the region Q which is unsuitable for the restoration process is included and a frame where the region Q which is unsuitable for the restoration process is not included, and continuity is important.

Accordingly, in the case shown in FIG. 15, in this aspect, the restoration adjustment unit 43 determines that the region Q which is unsuitable for the restoration process is included in the frame (t+1), that is, the reference frame, and adjusts the restoration intensity of the restoration process of the frame (t), that is, the frame to be processed. With this, in this aspect, it is possible to suppress deterioration of image quality due to the restoration process while suppressing the difference in the restoration intensity of the restoration process between the frame to be processed and the reference frame.

When a blinking light source is detected in the reference frame through image analysis, the restoration adjustment unit 43 adjusts the restoration process of the frame to be processed based on the blinking state of the light source. That is, since the process content of the restoration process changes between when the blinking light source is turned on and when the blinking light source is turned off, the restoration process with continuity is performed while suppressing the change.

For example, the restoration adjustment unit 43 may analyze the blinking state of the blinking light source to adjust the restoration intensity of the restoration process. The restoration adjustment unit 43 can acquire the restoration filter of the frame to be processed based on a restoration filter for use in a frame (for example, the reference frame) where the light source is turned on and a restoration filter for use in a frame (for example, the frame to be processed) where the light source is turned on.

When frame-in and frame-out of a normal light source (for example, the sun) are detected in the reference frame through image analysis, the restoration adjustment unit 43 adjusts the restoration process of the frame to be processed based on frame-in and frame-out of the normal light source. That is, since the content of the restoration process changes before and after frame-in of the normal light source or before and after frame-out, the restoration process with continuity is performed while suppressing the change.

For example, the restoration adjustment unit 43 may adjust the restoration intensity of the restoration process based on frame-in and frame-out of the normal light source. The restoration adjustment unit 43 can acquire the restoration filter of the frame to be processed based on a restoration filter for use in a frame (for example, the reference frame) before frame-in of the normal light source and a restoration filter for use in a frame (for example, the frame to be processed) after frame-in of the normal light source.

As described above, in the third embodiment described above, the content of the restoration process of the frame to be processed changes with the image information of the reference frame. With this, in the third embodiment, it is possible to suppress deterioration due to the restoration process while maintaining continuity of the content of the restoration process.

Fourth Embodiment

In this embodiment, when a moving object (moving body) is detected in a moving image by the moving body detection unit 49, the restoration adjustment unit 43 changes the content of the restoration process.

In this embodiment, description of the same configuration and action as in the first embodiment described above will not be repeated.

Figure 16:
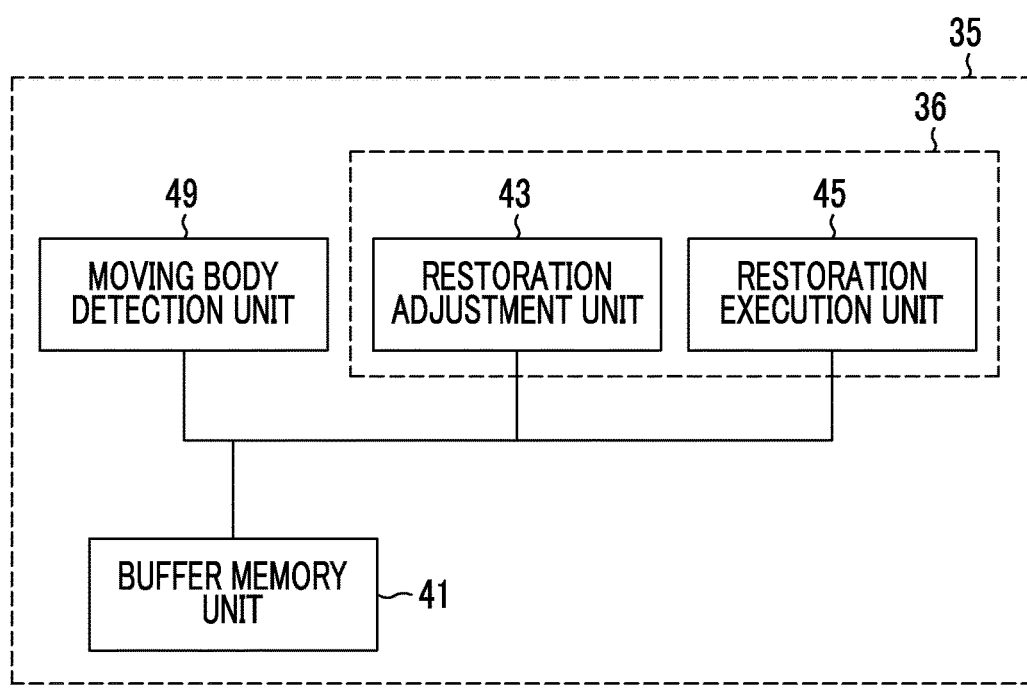
FIG. 16 is a block diagram showing an example of the functional configuration of an image processing unit in a fourth embodiment.

FIG. 16 is a functional block diagram relating to a restoration process of a fourth embodiment, and shows various functional blocks constituted by the image processing unit 35 (see FIG. 2).

The image processing unit 35 includes a buffer memory unit 41, a restoration control processing unit 36, and a moving body detection unit 49, and the buffer memory unit 41, the restoration control processing unit 36, and the moving body detection unit 49 can perform communication of data with one another.

The moving body detection unit 49 detects a moving boy in a moving image constituted of a plurality of continuous frames in a time series temporarily stored in the buffer memory unit 41. Then, the moving body detection unit 49 sends information that a moving body is detected in the frame to be processed and the reference frame to the restoration adjustment unit 43. As a detection method of a moving body of the moving body detection unit 49, various methods can be used. For example, the moving body detection unit 49 can detect a moving body by analyzing the moving image stored in the buffer memory unit 41. The moving body detection unit 49 can detect not only motion of a main object but also motion of a non-main object.

The restoration adjustment unit 43 acquires information that a moving body exists in the frame to be processed and the reference frame from the moving body detection unit 49. Then, the restoration adjustment unit 43 performs the restoration process based on the point spread function reflecting the phase characteristics according to motion of the moving body for the frame to be processed based on information.

The restoration process based on the point spread function reflecting the phase characteristics according to motion of the moving body is a restoration process which is performed using a phase transfer function (PTF) as a phase component of an optical transfer function (OTF) of a result of performing Fourier transform on the point spread function (PSF). An amplitude component of the optical transfer function is referred to as a modulation transfer function (MTF).

Meanwhile, when information that a moving body does not exist in the frame to be processed and the reference frame is acquired from the moving body detection unit 49, the restoration adjustment unit 43 performs the restoration process based on the point spread function. In this case, a restoration process based on a point spread function reflecting the amplitude characteristics and the phase characteristics may be performed, and a restoration process based on a point spread function only reflecting the amplitude characteristics may be performed.

As described above, in the fourth embodiment described above, when a moving body is detected in the frame to be processed and the reference frame, the restoration process is performed using the phase characteristics according to motion of the moving body based on the moving body. With this, it is possible to appropriately perform a restoration process even for a moving body.

Other Embodiments

The invention includes an image processing method which is performed in the image processing device and the imaging device described above.

The invention may include a program which causes a computer to execute the above-described image process. The invention may include a storage medium having a program code recorded thereon.

As a storage medium for supplying a program code, for example, a floppy (Registered Trademark) disk, a hard disk, an optical disk, a magneto-optical disk, a CD-ROM, a CD-R, a magnetic tape, a nonvolatile memory card, a ROM, or the like can be used.

The functions of the above-described embodiments are realized by a computer which executes a read program. The execution of the program includes a case where an OS or the like running on the computer performs a part or the whole of an actual process based on an instruction of the program.

<Application Example to EDoF System>

Although the restoration process in the embodiments described above is an image process for recovering and correcting point spread (point image blur) according to a specific photographing condition (for example, a diaphragm value, an F value, a focal distance, a lens type, or a combination thereof) to restore an original object image, an image restoration process to which the invention can be applied is not limited to the restoration process in the embodiments described above. For example, the restoration process according to the invention can also be applied to a restoration process on image data photographed and acquired by an optical system (a photographing lens or the like) having an extended depth of field (focus) (extended depth of field (EDoF)). Image data of a blurred image photographed and acquired in a state where the depth of field (depth of focus) is extended by the EDoF optical system is subjected to the restoration process, whereby image data of high resolution in a focused state over a wide range can be restored and generated. In this case, the restoration process is performed using a restoration filter based on a point spread function (PSF, OTF, MTF, PTF, or the like) of the EDoF optical system and having a filter coefficient set such that satisfactory image restoration can be performed within a range of an extended depth of field (depth of focus).

Hereinafter, an example of a system (EDoF system) relating to restoration of image data photographed and acquired through the EDoF optical system will be described. In an example described below, although an example where a luminance signal (Y data) obtained from image data (RGB data) after a demosaic process is subjected to a restoration process will be described, the timing of the restoration process is not particularly limited, and for example, "image data (mosaic image data) before a demosaic process" or "image data (demosaic image data) after a demosaic process and before a luminance signal conversion process" may be subjected to the restoration process.

Figure 17:
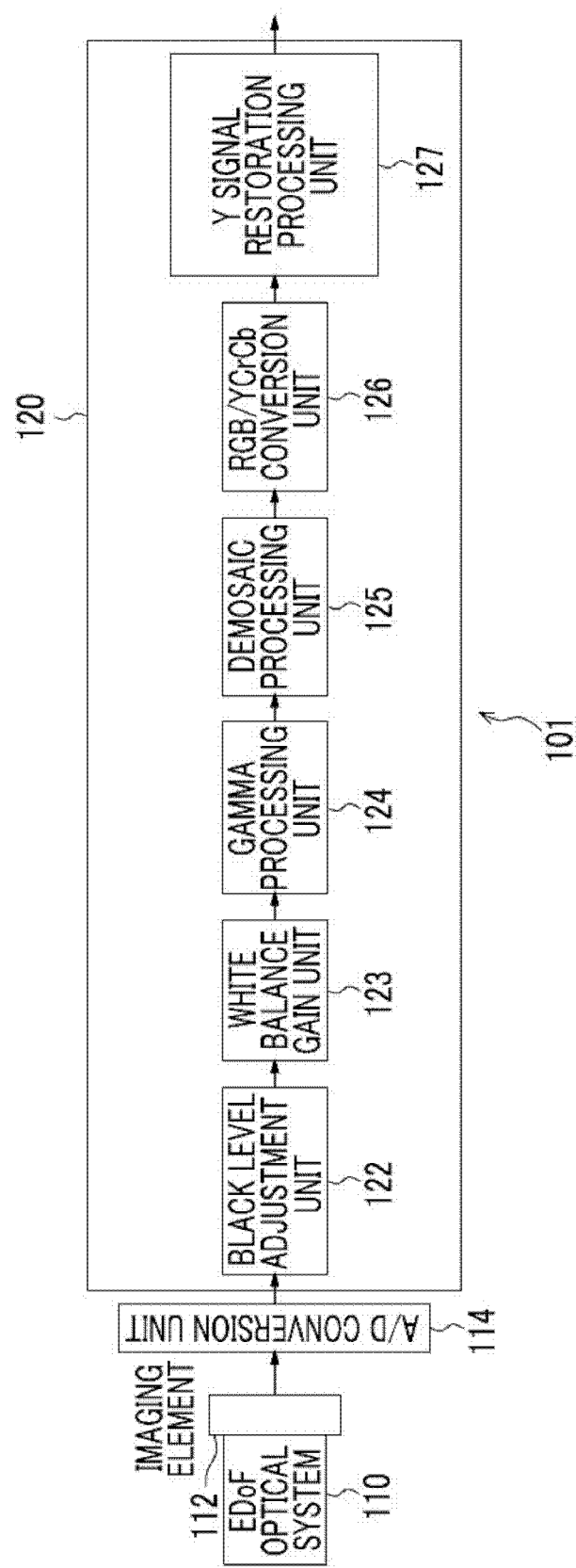
FIG. 17 is a block diagram showing a form of an imaging module including an EDoF optical system.

FIG. 17 is a block diagram showing a form of an imaging module 101 including an EDoF optical system. The imaging module 101 (digital camera or the like) of this example includes an EDoF optical system (lens unit) 110, an imaging element 112, an AD conversion unit 114, and a restoration processing block (the image processing unit 35) 120.

Figure 18:
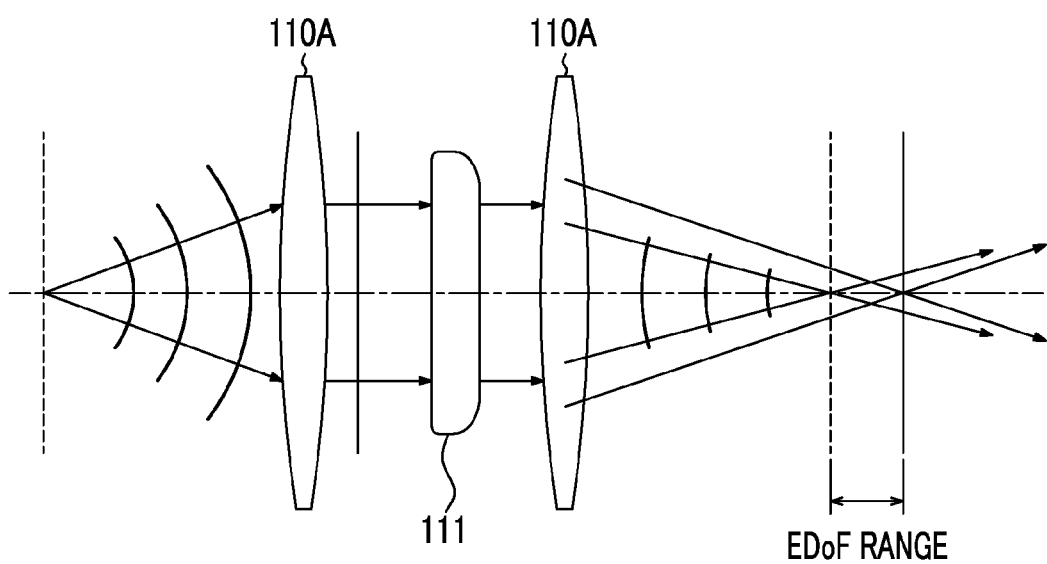
FIG. 18 is a diagram showing an example of the EDoF optical system.

FIG. 18 is a diagram showing an example of an EDoF optical system 110. The EDoF optical system 110 of this example has a single-focus fixed photographing lens 110A, and an optical filter 111 which is arranged at a pupil position. The optical filter 111 modulates a phase, and makes the EDoF optical system 110 (the photographing lens 110A) have an extended depth of field such that an extended depth of field (an extended depth of focus) (EDoF) is obtained. In this way, the photographing lens 110A and the optical filter 111 constitute a lens unit which modulates a phase to extend a depth of field.

The EDoF optical system 110 includes other components as necessary, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the EDoF optical system 110 (the photographing lens 110A) may be realized by other means. For example, instead of providing the optical filter 111, the EDoF of the EDoF optical system 110 may be realized by the photographing lens 110A designed to have the same function as the optical filter 111 of this example.

That is, the EDoF of the EDoF optical system 110 can be implemented by various means for changing the wavefront of imaging on the light receiving surface of the imaging element 112. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 110. In this way, the invention can be applied to not only a case where image formation can be performed to be regularly dispersed by an optical wavefront modulation element (the optical filter 111 (phase plate)), but also a case where the same dispersed images as the case of using the optical wavefront modulation element can be formed by the photographing lens 110A itself without using the optical wavefront modulation element.

The EDoF optical system 110 shown in FIG. 18 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the imaging element 112 shown in FIG. 17 and is converted to an electrical signal here.

The imaging element 112 is constituted of a plurality of pixels arranged in a matrix in a predetermined pattern array (Bayer array, G stripe R/G full checkered pattern, X-Trans array, honeycomb array, or the like), and each pixel includes a microlens, a color filter (in this example, an RGB color filter), and a photodiode. An optical image incident on the light receiving surface of the imaging element 112 through the EDoF optical system 110 is converted to a signal charge in the amount according to the amount of incident light by each photodiode arranged on the light receiving surface. The signal charge of R, G, and B accumulated in each photodiode is sequentially output as a voltage signal (image signal) for each pixel.

The AD conversion unit 114 converts the analog R, G, and B image signals output from the imaging element 112 for each pixel to digital RGB image signals. The digital image signals converted to the digital image signals by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 subjects the digital image signals output from the AD conversion unit 114 to black level adjustment. For the black level adjustment, a known method may be used. For example, when focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 123 performs gain adjustment according to a white balance gain of each of the color signals of RGB included in the digital image signals with adjusted black level data.

The gamma processing unit 124 performs gamma correction to perform gradation correction, such as halftone, such that the R, G, and B image signals subjected to the white balance adjustment have desired gamma characteristics.

The demosaic processing unit 125 subjects the R, G, and B image signals after gamma correction to a demosaic process. Specifically, the demosaic processing unit 125 subjects the R, G, and B image signals to a color interpolation process to generate a set of image signals (R signal, G signal, and B signal) output from the respective light receiving pixels of the imaging element 112. That is, although a pixel signal from each light receiving pixel is one of the R, G, and B image signals before color demosaic process, a set of three pixel signals of R, G, and B signals corresponding to each light receiving pixel is output after color demosaic process.

The RGB/YCrCb conversion unit 126 converts the R, G, and B signals of each pixel subjected to the demosaic process to a luminance signal Y and color difference signals Cr and Cb and outputs the luminance signal Y and the color difference signals Cr and Cb of each pixel.

The Y signal restoration processing unit 127 subjects the luminance signal Y output from the RGB/YCrCb conversion unit 126 to a restoration process based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for a deconvolution process (reverse convolution calculation process) of phase modulation of the optical filter 111. For the restoration filter, one corresponding to the optical filter 111 is stored in a memory (not shown) (for example, a memory incidentally attached with the Y signal restoration processing unit 127). The kernel size of the deconvolution kernel is not limited to 7×7.

Figure 19:
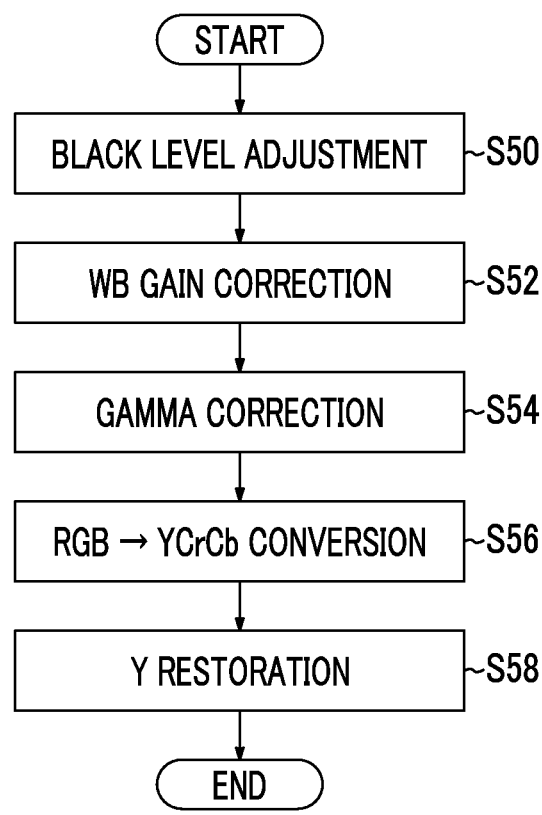
FIG. 19 is a diagram showing an example of a restoration processing flow in a restoration processing block shown in FIG. 17.

Next, the restoration process by the restoration processing block 120 will be described. FIG. 19 is a diagram showing an example of a restoration process flow by the restoration processing block 120 shown in FIG. 17.

The digital image signal is applied from the AD conversion unit 114 to one input of the black level adjustment unit 122, black level data is applied to the other input of the black level adjustment unit 122, and the black level adjustment unit 122 subtracts black level data from the digital image signal and outputs the digital image signal black level data subtracted to the white balance gain unit 123 (S50). With this, no black level component is included in the digital image signal, and a digital image signal indicating a black level becomes 0.

Image data after the black level adjustment is sequentially subjected to the processes by the white balance gain unit 123 and the gamma processing unit 124 (S52 and S54).

The R, G, and B signals subjected to gamma correction are subjected to the demosaic process in the demosaic processing unit 125 and are then converted to the luminance signal Y and the color difference signals Cr and Cb in the RGB/YCrCb conversion unit 126 (S56).

The Y signal restoration processing unit 127 subjects the luminance signal Y to the restoration process to apply the deconvolution process of phase modulation of the optical filter 111 of the EDoF optical system 110 (S58). That is, the Y signal restoration processing unit 127 performs the deconvolution process (reverse convolution calculation process) of a luminance signal (in this case, a luminance signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The Y signal restoration processing unit 127 performs the restoration process for removing image blur of the entire image by repeating the deconvolution process of each pixel group of the predetermined unit so as to cover the entire area of the imaging surface. The restoration filter is determined according to the position of the center of the pixel group subjected to the deconvolution process. That is, the common restoration filter is applied to adjacent pixel groups. In addition, in order to simplify the restoration process, it is preferable to apply the common restoration filter to all pixel groups.

Figure 20:
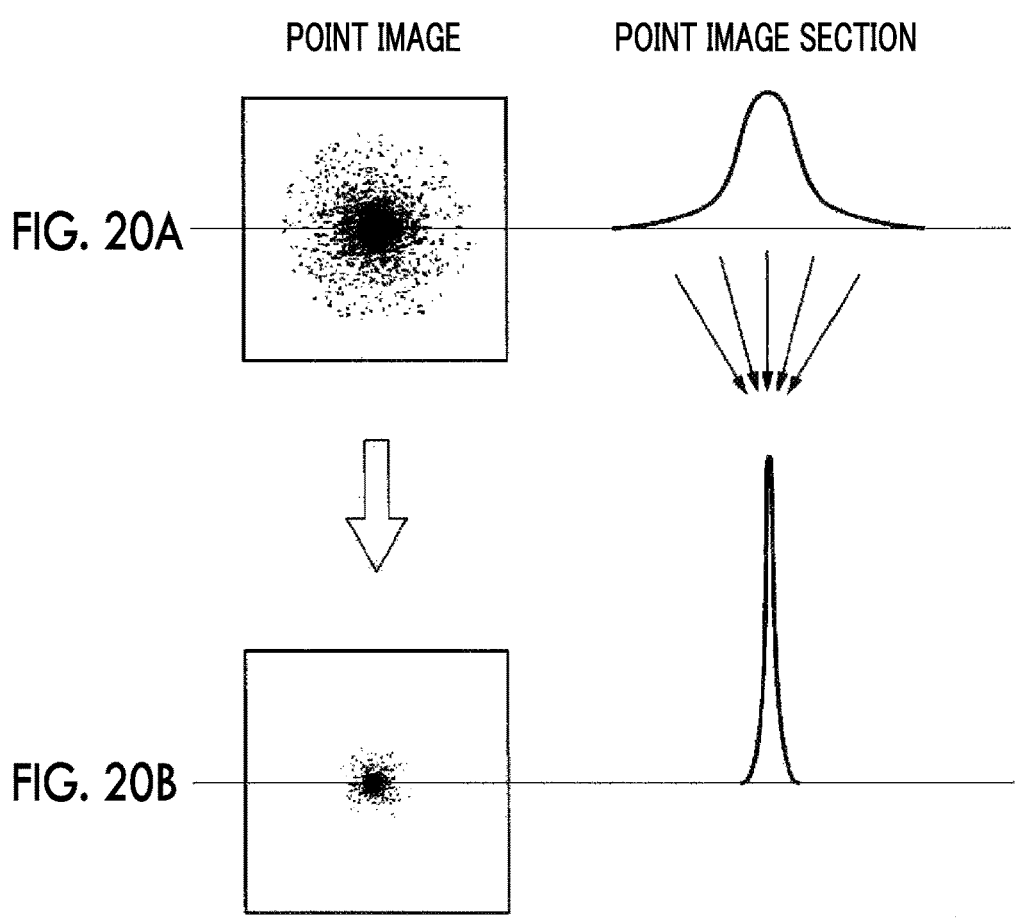
FIGS. 20A and 20B are diagrams showing a restoration example of an image acquired through the EDoF optical system.

As shown in FIG. 20A, a point image (optical image) of the luminance signal after passing through the EDoF optical system 110 is formed on the imaging element 112 as a great point image (blurred image), but is restored to a small point image (image of high resolution) by the deconvolution process in the Y signal restoration processing unit 127 as shown in FIG. 20B.

As described above, the restoration process is applied to the luminance signal after the demosaic process, whereby it is not necessary to separately provide the parameters of the restoration process for RGB, and it is possible to accelerate the restoration process. Furthermore, instead of putting together the R, G, and B image signals corresponding to the R, G, and B pixels at discrete positions in one unit and performing the deconvolution process, the luminance signals of adjacent pixels are put together in a predetermined unit and the common restoration filter is applied to this unit and the deconvolution process is performed; therefore, the accuracy of the restoration process is improved. In regards to the color difference signals Cr and Cb, resolution does not need to be increased by the restoration process in terms of image quality because of the visual characteristic of human eyes. Furthermore, when recording an image in a compression format, such as JPEG, the color difference signals are compressed at a higher compression rate than the luminance signal; therefore, there is less necessity to increase resolution by the restoration process. Consequently, it is possible to achieve improvement of restoration accuracy and simplification and acceleration of the process.

The point image restoration process according to the embodiments described above can be applied to the restoration process of the EDoF system described above.

An aspect to which the invention can be applied is not limited to the digital camera 10, the computer 60, and the server 80, and the invention can be applied to mobile devices having an imaging function and functions (call handling function, communication function, and other computer functions) other than image capturing, in addition to cameras having image capturing as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

<Configuration of Smartphone>

Figure 21:
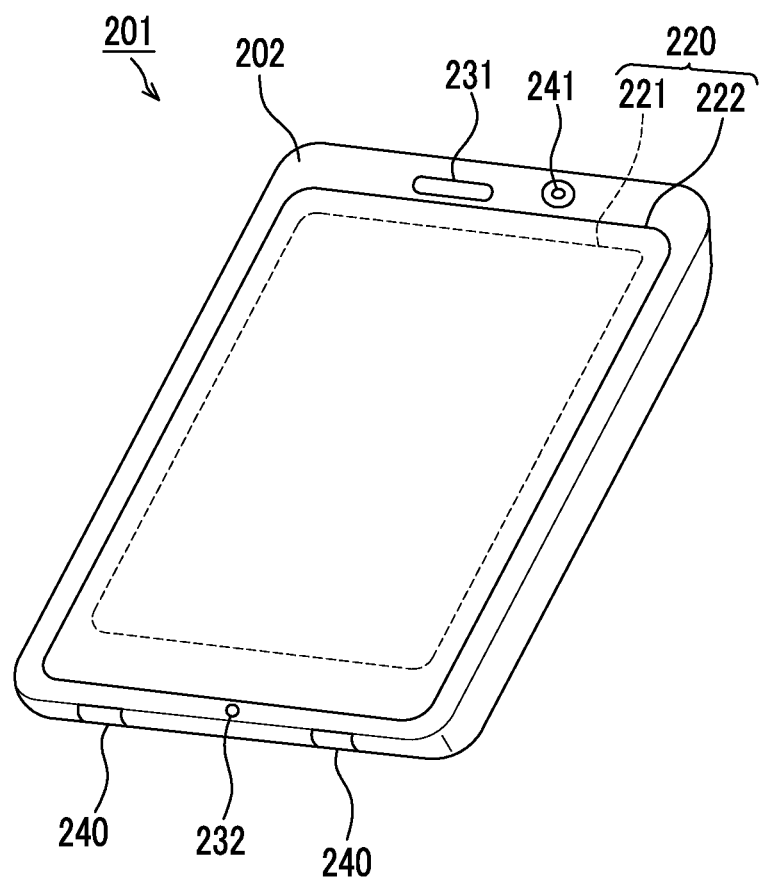
FIG. 21 is an appearance diagram of a smartphone.

FIG. 21 shows the appearance of a smartphone 201 which is an embodiment of an imaging device of the invention. The smartphone 201 shown in FIG. 21 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 22:
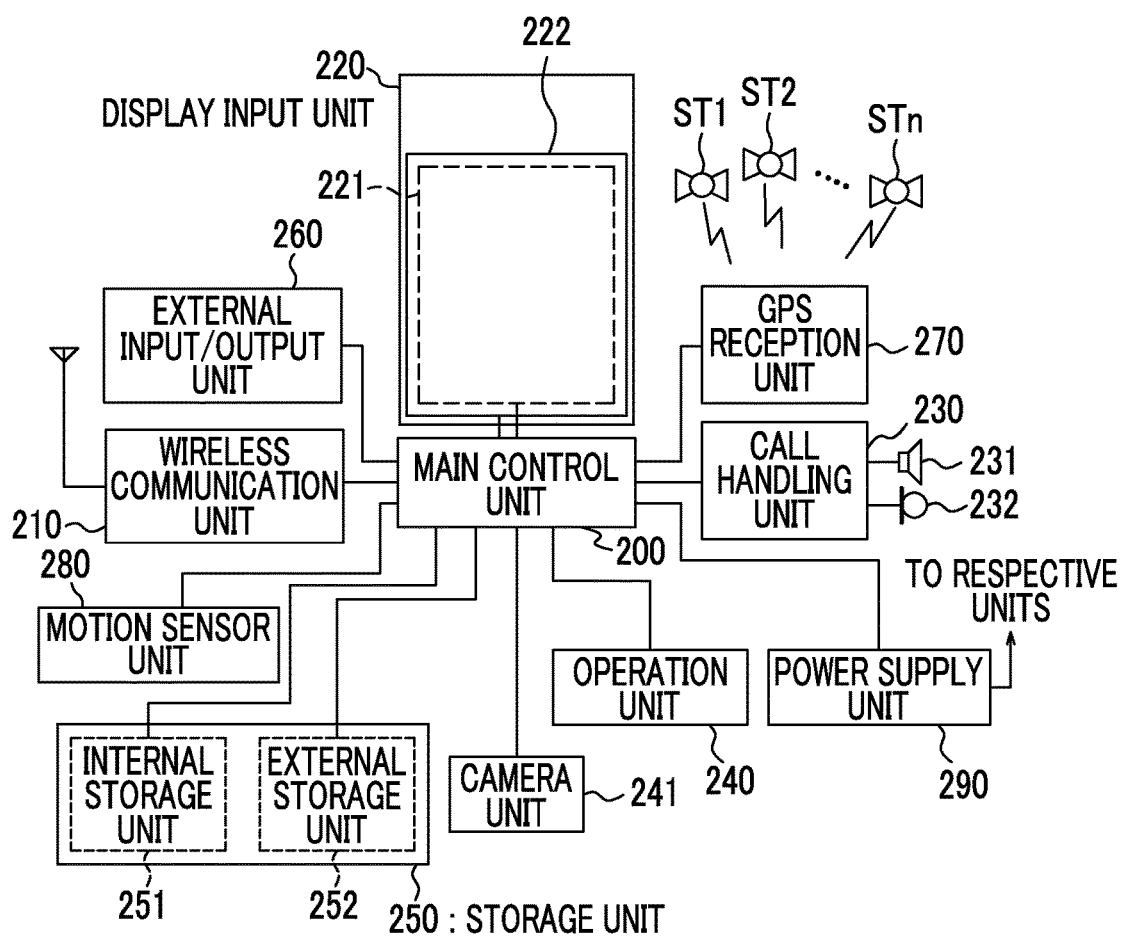
FIG. 22 is a block diagram showing the configuration of the smartphone shown in FIG. 21.

FIG. 22 is a block diagram showing the configuration of the smartphone 201 shown in FIG. 21. As shown in FIG. 22, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200 (including the above-described camera body controller 28). The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and moving image), character information, or the like under the control of the main control unit 200 to visually transfer information to the user and detects a user's operation on the displayed information, and includes the display panel 221 and the operation panel 222.

The display panel 221 uses, for example, a liquid crystal display (LCD) or an organic electro-luminescence display (OELD), as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 21, the display panel 221 and the operation panel 222 of the smartphone 201 illustrated as an embodiment of an imaging device of the invention are integrated to constitute the display input unit 220, and the operation panel 222 is arranged so as to completely cover the display panel 221. When this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed based on the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, converts speech of the user input through the microphone 232 to speech data processable in the main control unit 200 and outputs speech data to the main control unit 200, or decodes speech data received by the wireless communication unit 210 or the external input/output unit 260 and outputs speech from the speaker 231. As shown in FIG. 21, for example, the speaker 231 can be mounted on the same surface as the surface on which the display input unit 220 is provided, and the microphone 232 may be mounted on the side surface of the housing 202.

The operating unit 240 is a hardware key, such as a key switch, and receives an instruction from the user. For example, as shown in FIG. 21, the operating unit 240 is a push button-type switch which is mounted on the side surface of the housing 202 of the smartphone 201, and is turned on when pressed with a finger or the like and is turned off by a restoration force of the panel or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD (Registered Trademark) memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 201 is, for example, a wired or wireless headset, a wired or wireless external charger, a wired or wireless data port, a memory card connected through a card socket, a subscriber identity module card (SIM)/user identity module card (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes a positioning calculation process based on a plurality of received GPS signals, and detects the position of the smartphone 201 having latitude, longitude, and altitude. When positional information can be acquired from the wireless communication unit 210 or the external input/output unit 260 (for example, a wireless LAN), the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a device facing the smartphone 201, an electronic mail function of transmitting and receiving electronic mail, a Web browsing function of browsing Web pages, or the like.

The main control unit 200 has an image processing function of displaying video on the display input unit 220, or the like based on image data (still image or moving image data), such as received data or downloaded streaming data. The image processing function refers to a function of the main control unit 200 decoding image data, subjecting the decoding result to an image process, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance based on the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an imaging element, such as a complementary metal oxide semiconductor (CMOS) or a charge-coupled device (CCD). The camera unit 241 can convert image data obtained by image capturing to compressed image data, such as joint photographic coding experts group (JPEG), and can record image data in the storage unit 250 or can output image data through the external input/output unit 260 or the wireless communication unit 210 under the control of the main control unit 200. As shown in FIG. 21, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. When a plurality of camera units 241 are mounted, the camera unit 241 which is used to capture an image is switched from one to another and captures an image alone, or a plurality of camera units 241 are simultaneously used to capture images.

The camera unit 241 can be used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a moving image can be attached with positional information acquired by the GPS reception unit 270, speech information acquired by the microphone 232, speech information (may be text information through speech-text conversion in the main control unit or the like), posture information acquired by the motion sensor unit 280, or the like and can be recorded in the storage unit 250. Image data may be output through the input/output unit 260 or the wireless communication unit 210.

In the smartphone 201 described above, the respective processing units described above in connection with the point image restoration process can be appropriately implemented by, for example, the main control unit 200, the storage unit 250, and the like.

The invention is not limited to the embodiments described above, and various modifications can be made without departing from the spirit of the invention.

Explanation of References

10: digital camera, 12: optical system, 14: camera body, 16: lens, 17: diaphragm, 18: optical system operating unit, 20: optical system controller, 22: optical system input/output unit, 26: imaging element, 28: camera body controller, 30: camera body input/output unit, 32: input/output interface, 33: display unit, 34: device control unit, 35: image processing unit, 36: restoration control processing unit, 37: user interface, 41: buffer memory unit, 43: restoration adjustment unit, 45: restoration execution unit, 47: object detection unit, 49: moving body detection unit, 60: computer, 62: computer input/output unit, 64: computer controller, 66: display, 70: Internet, 80: server, 82: server input/output unit, 84: server controller, 101: imaging module, 110: EDoF optical system, 110A: photographing lens, 111: optical filter, 112: imaging element, 114: AD conversion unit, 120: restoration processing block, 122: black level adjustment unit, 123: white balance gain unit, 124: gamma processing unit, 125: demosaic processing unit, 126: conversion unit, 127: Y signal restoration processing unit, 200: main control unit, 201: smartphone, 202: housing, 210: wireless communication unit, 220: display input unit, 221: display panel, 222: operation panel, 230: call handling unit, 231: speaker, 232: microphone, 240: operating unit, 241: camera unit, 250: storage unit, 251: internal storage unit, 252: external storage unit, 260: external input/output unit, 270: GPS reception unit, 270: reception unit, 280: motion sensor unit, 290: power supply unit

What is claimed is:

1. An image processing device comprising:
  a restoration control processing unit which subjects a moving image including a plurality of frames acquired by photographing using an optical system to a restoration process based on a point spread function of the optical system to acquire recovered image data,
  wherein the restoration control processing unit controls the restoration process for a frame to be processed among the plurality of frames based on imaging information of a reference frame including a frame after the frame to be processed in a time series, and
  wherein the imaging information includes photographing condition information of the frame to be processed and the reference frame.

2. The image processing device according to claim 1,
  wherein the reference frame includes a frame before the frame to be processed in a time series.

3. The image processing device according to claim 2
  wherein the reference frame includes a frame immediately before and a frame immediately after the frame to be processed in a time series.

4. The image processing device according to claim 1,
  wherein the restoration control processing unit controls the restoration process for the frame to be processed based on the imaging information of the reference frame and the imaging information of the frame to be processed.

5. The image processing device according to claim 1,
  wherein the photographing condition information includes at least one of a diaphragm value and a zoom magnification.

6. The image processing device according to claim 1,
wherein the restoration control processing unit performs the restoration process based on the most frequent photographing condition among the photographing condition information of the frame to be processed and the reference frame.

7. The image processing device according to claim 1,
wherein the restoration process includes a filtering process using a restoration filter based on the point spread function, and
the restoration control processing unit performs a filtering process using, as a restoration filter, a filter calculated based on a restoration filter corresponding to the photographing condition information of the frame to be processed and a restoration filter corresponding to the photographing condition information of the reference frame for the frame to be processed to perform the restoration process for the frame to be processed.

8. The image processing device according to claim 7,
wherein the restoration control processing unit performs a filtering process using, as a restoration filter, a filter calculated from a weighted average of a restoration filter corresponding to the photographing condition information of the frame to be processed and a restoration filter corresponding to the photographing condition information of the reference frame for the frame to be processed to perform the restoration process for the frame to be processed.

9. The image processing device according to claim 7,
wherein the restoration control processing unit sets image data calculated from a weighted average of image data calculated by applying a restoration filter corresponding to the photographing condition information of the frame to be processed to the frame to be processed and image data calculated by applying a restoration filter corresponding to the photographing condition information of the reference frame to the reference frame as the recovered image data of the frame to be processed.

10. The image processing device according to claim 7, further comprising:
an object detection unit which detects motion of an object of the moving image,
wherein, in case where the motion amount of the object in the frame to be processed and the reference frame detected by the object detection unit is equal to or greater than a threshold value, the restoration control processing unit performs a filtering process using, as a restoration filter, a filter calculated from a weighted average of a restoration filter corresponding to the photographing condition information of the frame to be processed and a restoration filter corresponding to the photographing condition information of the reference frame for the frame to be processed to perform the restoration process for the frame to be processed, and
in case where the motion amount of the object in the frame to be processed and the reference frame detected by the object detection unit is less than the threshold value, the restoration control processing unit sets image data calculated from a weighted average of image data calculated by applying a restoration filter corresponding to the photographing condition information of the frame to be processed to the frame to be processed and image data calculated by applying a restoration filter corresponding to the photographing condition information of the reference frame to the reference frame as the recovered image data of the frame to be processed.

11. The image processing device according to claim 1,
wherein the imaging information includes image information of the frame to be processed and the reference frame.

12. The image processing device according to claim 11,
wherein the image information includes at least one of information regarding whether or not a saturated pixel is included in the frame to be processed and the reference frame and information regarding whether or not a defocus region is included in the frame to be processed and the reference frame.

13. The image processing device according to claim 11,
wherein the image information includes information regarding whether or not a saturated pixel is included in the frame to be processed and the reference frame, and
the restoration control processing unit determines whether or not a saturated pixel is included in the reference frame, and in case where it is determined that the saturated pixel is included in the reference frame, adjusts the restoration intensity of the restoration process for the frame to be processed based on the imaging information of the reference frame where the saturated pixel is included.

14. The image processing device according to claim 13,
wherein the restoration control processing unit
analyzes a blinking state of a light source in the reference frame, and
adjusts the restoration intensity of the restoration process for the frame to be processed based on the blinking state of the light source.

15. The image processing device according to claim 11,
wherein the image information includes information regarding whether or not a defocus region is included in the frame to be processed and the reference frame, and
the restoration control processing unit determines whether or not a defocus region is included in the reference frame, and in case where it is determined that the defocus region is included in the reference frame, adjusts the restoration intensity of the restoration process for the frame to be processed based on the imaging information of the reference frame where the defocus region is included.

16. The image processing device according to claim 1, further comprising:
a moving body detection unit which detects a moving body in the moving image,
wherein, in case where the moving body is detected in the frame to be processed and the reference frame by the moving body detection unit, the restoration control processing unit subjects the frame to be processed to the restoration process based on the point spread function reflecting phase characteristics based on motion of the moving body.

17. The image processing device according to claim 1,
wherein the restoration control processing unit has
a filter application unit which applies a restoration filter based on a point spread function of the optical system to source image data of the moving image to acquire restored image data, and
a gain adjustment unit which performs adjustment of an amplification factor of the difference between the source image data and the restored image data, and acquires the recovered image data of the moving image from the difference after the adjustment is performed and the source image data, and
the restoration process for the frame to be processed is controlled by adjusting at least one of the restoration filter and the amplification factor based on photographing information of the reference frame.

18. The image processing device according to claim 1, wherein the optical system has a lens unit which modulates a phase to extend a depth of field.

19. An imaging device comprising:
an imaging element which acquires a moving image by photographing using an optical system; and
the image processing device according to claim 1.

20. The imaging device according to claim 19, further comprising:
a display unit which displays a live view image,
wherein the restoration control processing unit performs the restoration process based on the point spread function of the optical system for the live view image, and the restoration process for the live view image controls the restoration process for the frame to be processed among a plurality of frames constituting the live view image based on imaging information of the frame to be processed without depending on imaging information of a frame acquired before or after the frame to be processed in a time series.

21. The imaging device according to claim 19, further comprising:
a display unit which displays a live view image,
wherein the restoration control processing unit does not perform the restoration process based on the point spread function of the optical system for the live view image.

22. An image processing method using the image processing device according to claim 1 comprising:
a procedure for subjecting a moving image including a plurality of frames acquired by photographing using an optical system to a restoration process based on a point spread function of the optical system to acquire recovered image data,
wherein the restoration process for a frame to be processed among the plurality of frames is controlled based on imaging information of a reference frame including a frame after the frame to be processed in a time series,
wherein the imaging information includes photographing condition information of the frame to be processed and the reference frame.

23. A non-transitory computer readable medium storing a program, the program causing a computer to execute the image processing method according to claim 22, comprising:
a procedure for subjecting a moving image including a plurality of frames acquired by photographing using an optical system to a restoration process based on a point spread function of the optical system to acquire recovered image data,
wherein the restoration process for a frame to be processed among the plurality of frames is controlled based on imaging information of a reference frame including a frame after the frame to be processed in a time series,
wherein the imaging information includes photographing condition information of the frame to be processed and the reference frame.

24. An image processing device comprising:
a restoration control processing unit which subjects a moving image including a plurality of frames acquired by photographing using an optical system to a restoration process based on a point spread function of the optical system to acquire recovered image data,
wherein the restoration control processing unit controls the restoration process for a frame to be processed among the plurality of frames based on imaging information of a reference frame including a frame after the frame to be processed in a time series,
wherein the imaging information includes image information of the frame to be processed and the reference frame, and
wherein the image information includes at least one of information regarding whether or not a saturated pixel is included in the frame to be processed and the reference frame and information regarding whether or not a defocus region is included in the frame to be processed and the reference frame.

25. An imaging device comprising:
an imaging element which acquires a moving image by photographing using an optical system,
the image processing device according to claim 24,
a display unit which displays a live view image,
wherein the restoration control processing unit performs the restoration process based on the point spread function of the optical system for the live view image, and the restoration process for the live view image controls the restoration process for the frame to be processed among a plurality of frames constituting the live view image based on imaging information of the frame to be processed without depending on imaging information of a frame acquired before or after the frame to be processed in a time series.

26. An image processing device comprising:
a restoration control processing unit which subjects a moving image including a plurality of frames acquired by photographing using an optical system to a restoration process based on a point spread function of the optical system to acquire recovered image data,
wherein the restoration control processing unit controls the restoration process for a frame to be processed among the plurality of frames based on imaging information of a reference frame including a frame after the frame to be processed in a time series, and
a moving body detection unit which detects a moving body in the moving image,
wherein, in case where the moving body is detected in the frame to be processed and the reference frame by the moving body detection unit, the restoration control processing unit subjects the frame to be processed to the restoration process based on the point spread function reflecting phase characteristics based on motion of the moving body.

27. An imaging device comprising:
an imaging element which acquires a moving image by photographing using an optical system; and
the image processing device according to claim 26,
a display unit which displays a live view image,
wherein the restoration control processing unit performs the restoration process based on the point spread function of the optical system for the live view image, and the restoration process for the live view image controls the restoration process for the frame to be processed among a plurality of frames constituting the live view image based on imaging information of the frame to be processed without depending on imaging information of a frame acquired before or after the frame to be processed in a time series.

28. An image processing device comprising:
a restoration control processing unit which subjects a moving image including a plurality of frames acquired by photographing using an optical system to a restoration process based on a point spread function of the optical system to acquire recovered image data, wherein the restoration control processing unit controls the restoration process for a frame to be processed among the plurality of frames based on imaging information of a reference frame including a frame after the frame to be processed in a time series, wherein the restoration control processing unit has a filter application unit which applies a restoration filter based on a point spread function of the optical system to source image data of the moving image to acquire restored image data, and a gain adjustment unit which performs adjustment of an amplification factor of the difference between the source image data and the restored image data, and acquires the recovered image data of the moving image from the difference after the adjustment is performed and the source image data, and the restoration process for the frame to be processed is controlled by adjusting at least one of the restoration filter and the amplification factor based on photographing information of the reference frame.

29. An imaging device comprising:

an imaging element which acquires a moving image by photographing using an optical system; and the image processing device according to claim 28, a display unit which displays a live view image, wherein the restoration control processing unit performs the restoration process based on the point spread function of the optical system for the live view image, and the restoration process for the live view image controls the restoration process for the frame to be processed among a plurality of frames constituting the live view image based on imaging information of the frame to be processed without depending on imaging information of a frame acquired before or after the frame to be processed in a time series.

\* \* \* \* \*